United States Patent
Okawa et al.

(10) Patent No.: US 6,317,762 B1
(45) Date of Patent: *Nov. 13, 2001

(54) DOCUMENT CREATING APPARATUS CREATES FREE FORMAT DOCUMENT FROM HANDWRITTEN DATA CONVERTING INTO NORMALIZED SIZE

(75) Inventors: Toru Okawa; Ryuichi Matsukura; Yasuo Sato, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/744,993

(22) Filed: Nov. 7, 1996

(30) Foreign Application Priority Data

Nov. 22, 1995 (JP) ................................................ 7-304034
Nov. 22, 1995 (JP) ................................................ 7-304035

(51) Int. Cl.$^7$ ............................................. G06F 17/30
(52) U.S. Cl. ........................... 707/541; 707/500; 707/521; 707/523; 707/526; 382/187
(58) Field of Search .................... 707/520–521, 707/526, 529, 541, 500, 523, 539; 382/180, 181, 186–187, 190, 103, 313, 294, 151, 290, 293, 182, 189, 229; 345/179, 358, 173, 467, 114, 127; 178/18.01, 18.02, 18.03; 704/224, 234

(56) References Cited

U.S. PATENT DOCUMENTS

| | | | | |
|---|---|---|---|---|
| 4,656,317 | * | 4/1987 | Tsugei et al. | 382/189 |
| 5,267,327 | * | 11/1993 | Hirayama | 382/13 |

(List continued on next page.)

FOREIGN PATENT DOCUMENTS 55-156982   12/1980 (JP).
57-105089    6/1982 (JP).

(List continued on next page.)

*Primary Examiner*—Jack Choules
*Assistant Examiner*—Srirama Channavajjala
(74) *Attorney, Agent, or Firm*—Staas & Halsey LLP

(57) ABSTRACT

A document creating apparatus creates a document in response to handwritten data generated from a handwritten data input device and displays the created document on a display screen. The document creating apparatus includes a setting mechanism for setting on the display screen one or a plurality of normalized regions having a normalized size as an attribute and one or a plurality of non-normalized regions having no normalized size as the attribute, a judging mechanism for judging whether input data are input to the normalized region or the non-normalized region, a first storing mechanism for converting a size of the input data into a normalized size of the normalized region and storing the normalized input data in a memory when the judging mechanism judges that the input data are input to the normalized region, and a second storing mechanism for storing the input data in the memory as they are when the judging mechanism judges that the input data are input to the non-normalized region.

70 Claims, 30 Drawing Sheets

U.S. PATENT DOCUMENTS

| | | | | |
|---|---|---|---|---|
| 5,325,447 | * | 6/1994 | Vogt, III | 382/102 |
| 5,389,745 | * | 2/1995 | Sakamoto | 178/18.03 |
| 5,502,461 | * | 3/1996 | Okamoto et al. | 345/173 |
| 5,513,278 | * | 4/1996 | Hashizume et al. | 345/173 |
| 5,537,489 | * | 7/1996 | Sinden et al. | 382/187 |
| 5,615,285 | * | 3/1997 | Beernink | 382/189 |
| 5,698,822 | * | 12/1997 | Haneda et al. | 178/18.01 |
| 6,240,207 | * | 5/2001 | Shinozuka et al. | 382/187 |

FOREIGN PATENT DOCUMENTS

| | | |
|---|---|---|
| 57-199071 | 12/1982 | (JP) . |
| 58-191088 | 11/1983 | (JP) . |
| 59-024387 | 2/1984 | (JP) . |
| 60-059487 | 4/1985 | (JP) . |
| 60-075980 | 4/1985 | (JP) . |
| 60-263257 | 12/1985 | (JP) . |
| 61-282972 | 12/1986 | (JP) . |
| 01-261720 | 10/1989 | (JP) . |
| 02-077925 | 3/1990 | (JP) . |
| 02-224168 | 9/1990 | (JP) . |
| 02-250153 | 10/1990 | (JP) . |
| 03-073052 | 3/1991 | (JP) . |
| 03-080296 | 4/1991 | (JP) . |
| 03-144870 | 6/1991 | (JP) . |
| 04-124716 | 4/1992 | (JP) . |
| 4-241074 | 8/1992 | (JP) . |
| 04-311275 | 11/1992 | (JP) . |
| 04-344918 | 12/1992 | (JP) . |
| 05-028234 | 2/1993 | (JP) . |
| 05-108878 | 4/1993 | (JP) . |
| 05-165818 | 7/1993 | (JP) . |
| 05-258041 | 10/1993 | (JP) . |
| 06-004206 | 1/1994 | (JP) . |
| 06-089367 | 3/1994 | (JP) . |
| 06-162001 | 6/1994 | (JP) . |
| 06-176120 | 6/1994 | (JP) . |
| 06-208654 | 7/1994 | (JP) . |
| 6-231308 | 8/1994 | (JP) . |

* cited by examiner

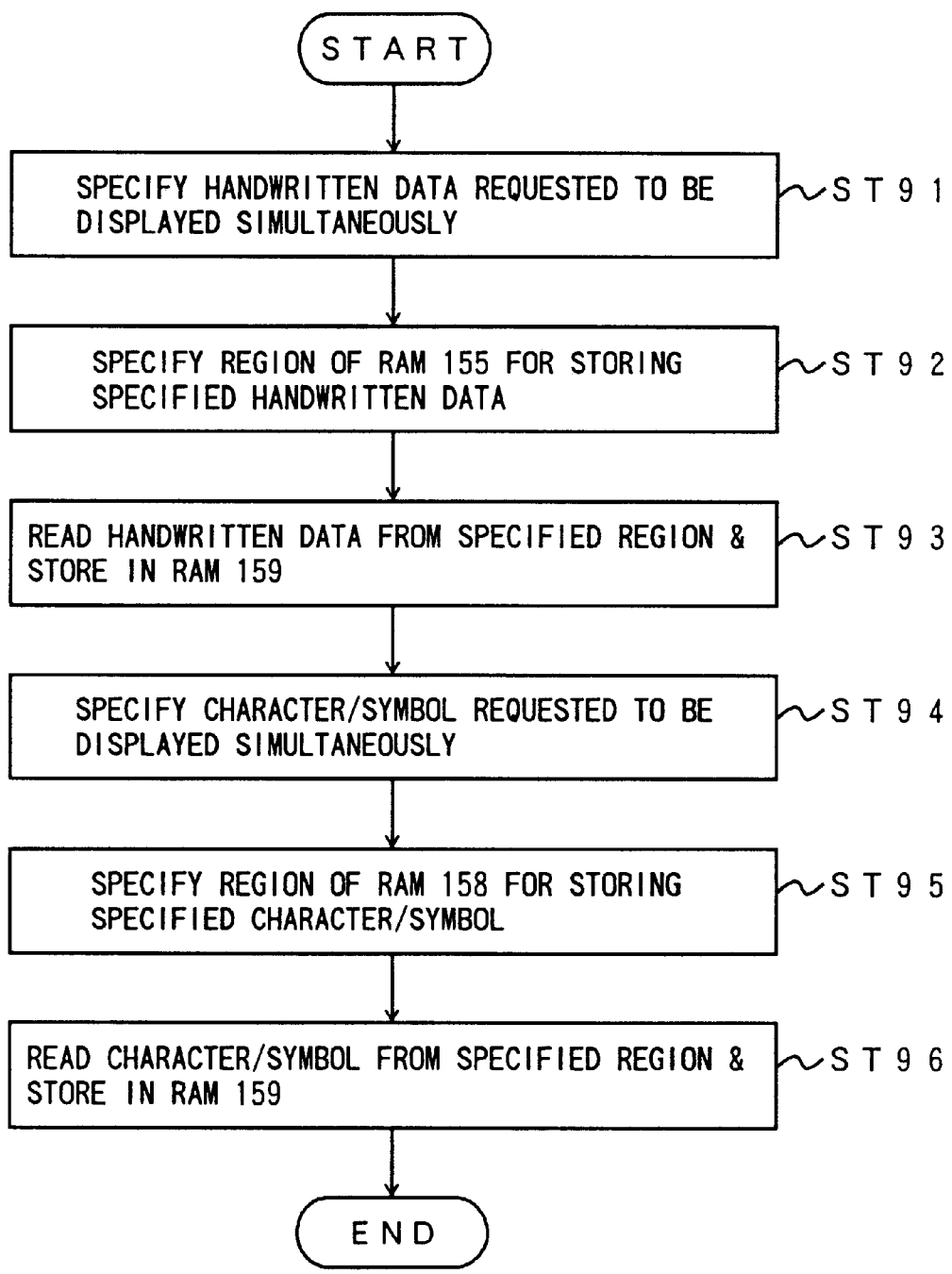

HANDWRITTEN DATA PORTION

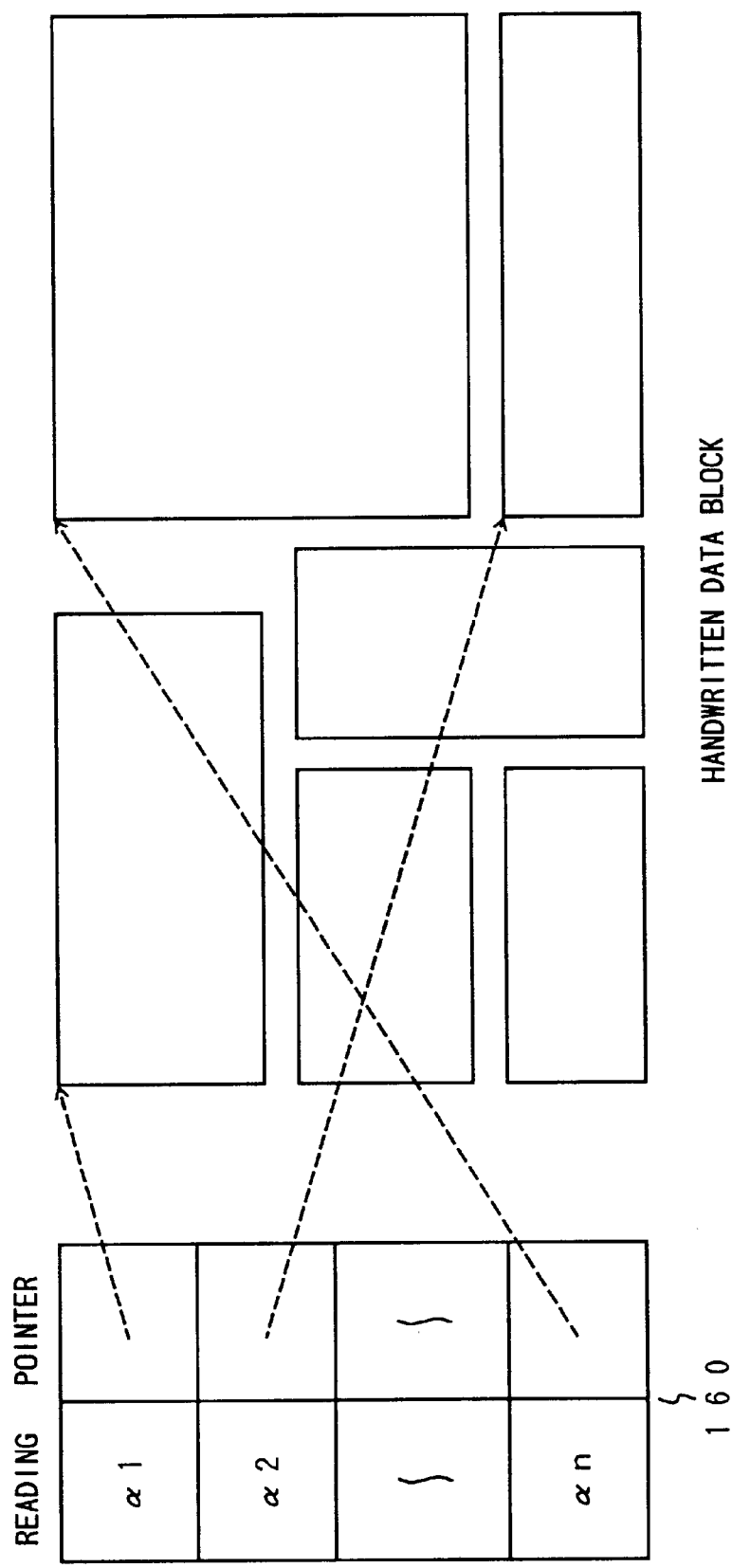

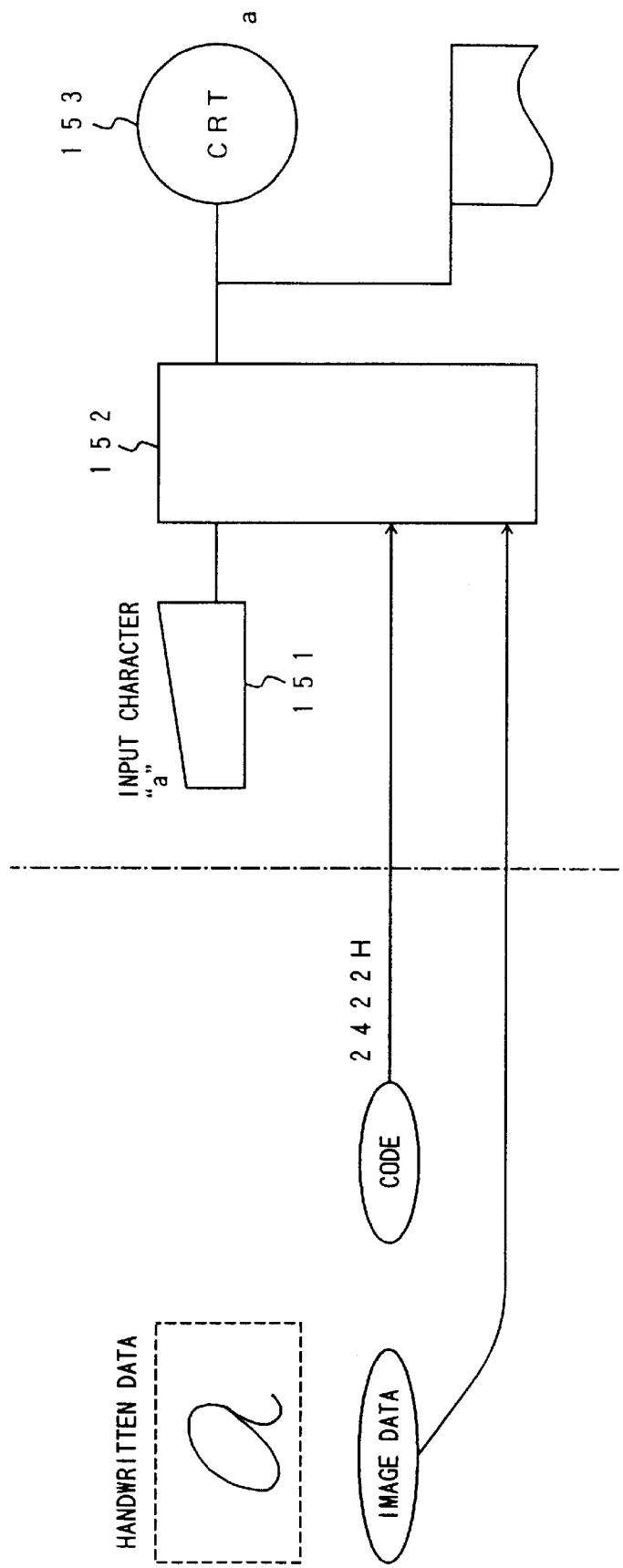

DOCUMENT CREATING APPARATUS CREATES FREE FORMAT DOCUMENT FROM HANDWRITTEN DATA CONVERTING INTO NORMALIZED SIZE

BACKGROUND OF THE INVENTION

The present invention generally relates to document creating apparatuses and computer program products therefor, and more particularly to a document creating apparatus which receives handwritten data generated by a handwritten data input device and creates a document having a free format and to a computer program product for such a document creating apparatus.

Recently, handwritten data input devices for inputting handwritten data to a document processing apparatus have become popular, particularly with portable document creating apparatuses such as the so-called handy electronic notebook type personal computers. The handwritten data input device supports input of the handwritten data, and it is desirable that the handwritten data input device enables document creation with a free format.

In the document creating apparatus which creates a document in response to handwritten data generated from the handwritten data input device, two input modes are provided, namely, a graphic input mode and a character input mode. According to the graphic input mode, the handwritten data are stored as they are in a memory and are displayed on a display screen. On the other hand, according to the character input mode, the handwritten data are converted into data having a prescribed normalized size and are stored in the memory while arranging the normalized data in a line, and the arranged data are displayed on the display screen.

A conventional document creating apparatus is designed to specify in advance the input mode with which the document is to be created. In the case of the graphic input mode, the document is created using the hand written data as they are without using the character input mode. On the other hand, in the ease of the character input mode, the document is created while converting the handwritten data into the data having the normalized size and arranging the normalized data in a line, without using the graphic input mode.

The document to be created may consist of one or more characters, symbols or spaces, one or more words, one or more sentences, graphics and the like.

In the conventional document creating apparatus, the normalized size is specified in advance when creating the document in the character input mode. The document is thus created by converting the handwritten data into the data having the specified normalized size and rearranging the normalized data in a line.

However, according to the conventional document creating apparatus, there was a problem in that the format of the document that can be created is limited, because it is impossible to create a document in which the handwritten data that can be converted into the normalized size and the handwritten data that cannot be converted into the normalized size coexist.

In addition, there was a problem in that the format of the document that can be created is limited, since it is impossible to create a document in which the handwritten data to be converted into different normalized sizes coexist.

SUMMARY OF THE INVENTION

Accordingly, it is a general object of the present invention to provide a novel and useful document creating apparatus and a computer program product therefor, in which the problems described above are eliminated.

Another and more specific object of the present invention is to provide a document creating apparatus and a computer program product therefor, which can create a document having a free format in response to handwritten data generated by a handwritten data input device.

Still another object of the present invention is to provide a document creating apparatus and a computer program product therefor, which can create a document having a format such that handwritten data and fair copy data coexist, and can enable simple reuse of the handwritten data in the created document.

A further object of the present invention is to provide a document creating apparatus which creates a document in response to handwritten data generated from a handwritten data input device and displays the created document on a display screen, comprising setting means for setting on the display screen one or a plurality of normalized regions having a normalized size as an attribute and one or a plurality of non-normalized regions having no normalized size as the attribute, judging means for judging whether input data are input to the normalized region or the non-normalized region, memory means, first storing means, coupled to the memory means and responsive to the judging means, for converting a size of the input data into a normalized size of the normalized region and storing the normalized input data in the memory means when the judging means judges that the input data are input to the normalized region, and second storing means, coupled to the memory means and responsive to the judging means, for storing the input data in the memory means as they are when the judging means judges that the input data are input to the non-normalized region. According to the document creating apparatus of the present invention, it is possible to create a document having a free format in which the handwritten data which are converted into the normalized size and the handwritten data which are not converted into thea normalized size coexist.

Another object of the present invention is to provide a document creating apparatus which creates a document in response to handwritten data generated from a handwritten data input device and displays the created document on a display screen, comprising setting means for setting on the display screen a plurality of normalized regions having different normalized sizes, judging means for judging one of the normalized regions to which input data are input, memory means, storing means, coupled to the memory means and responsive to the judging means, for converting a size of the input data into a normalized size of the normalized region judged by the judging means and storing the converted input data in the memory means. According to the document creating apparatus of the present invention, it is possible to create a document having a free format in which the handwritten data which are converted into different normalized sizes coexist.

Still another object of the present invention is to provide a document creating apparatus which creates a document in response to handwritten data generated from a handwritten data input device and displays the created document on a display screen, comprising memory means, a first input mode for inputting input data to a normalized region set on the display screen and storing the input data in the memory means after converting a size of the input data into a normalized size, a second input mode for inputting the input data to a non-normalized region set on the display screen and storing the input data in the memory means without converting the size of the input data into the normalized size, and setting changing means for cancelling the input mode in at least a portion of the region to which the input data are input in one of the first and second input modes,, and changing the cancelled portion into a region to which an input is made in the other of the first and second input modes. According to the document creating apparatus of the present invention, it is possible to create a document having a free format in which the handwritten data which are converted into the normalized size and the handwritten data which are not converted into the normalized size coexist.

A further object of the present invention is to provide a document creating apparatus which creates a document in response to handwritten data generated. from a handwritten data input device and displays the created document on a display screen, comprising memory means, storing means for storing input data in the memory means after converting a size of the input data into a normalized size, and setting changing means for cancelling the normalized size used to input the input data in at least a portion of a data input region on the display screen, and setting a data input region having another normalized size within the cancelled portion. According to the document creating apparatus of the present invention, it is possible to create a document having a free format in which the handwritten data which are converted into different normalized sizes coexist.

Another object of the present invention is to provide a document creating apparatus comprising a keyboard generating code data, converting means for converting the code data generated from the keyboard into character symbol data related to at least one of characters and symbols, a handwritten data input device generating handwritten data, and generating means for generating displaying data for displaying the handwritten data by changing a size of the handwritten data generated from the handwritten data input device to a size of the character/symbol data output from the converting means. According to the document creating apparatus of the present invention, the input unit of the handwritten data and the input unit of the fair copy data of the characters and/or symbols are defined in the block of the same size, so that it is possible to create a document having a format in which the handwritten data and the fair copy data of the characters and/or symbols coexist. The fair copy data are the image data specified by the code data.

Still another object of the present invention is to provide a document creating apparatus comprising a keyboard generating code data, converting means for converting the code data generated from the keyboard into character/symbol data related to at least one of characters and symbols, a handwritten data input device generating handwritten data, normalizing means for generating displaying data for displaying the handwritten data by normalizing a size of the handwritten data generated from the handwritten data input device, and generating means for generating displaying data for displaying the character/symbol data by changing a size of the character/symbol data output from the converting means to a size of the handwritten data output from the normalizing means. According to the document creating apparatus of the present invention, the input unit of the handwritten data and the input unit of the fair copy data of the characters and/or symbols are defined in the block of the same size, so that it is possible to create a document having a format in which the handwritten data and the fair copy data of the characters and/or symbols coexist. The fair copy data are the image data specified by the code data.

A further object of the present invention is to provide a document creating apparatus comprising a keyboard generating code data, converting means for converting the code data generated from the keyboard into character/symbol data related to at least one of characters and symbols, a handwritten data input device generating handwritten data, image memory means for storing the handwritten data, display memory means, developing means for developing the character/symbol data output from the converting means in the image memory means, and displaying means for generating displaying data for displaying a created document and to be stored in the display memory means from the data stored in the image memory means. According to the document creating apparatus of the present invention, the fair copy data of the characters and/or symbols are treated as image data, similarly to the handwritten data, where the fair copy data are the image data specified by the code data. Hence, it is possible to create a document having a format in which the handwritten data and the fair copy data of the characters and/or symbols coexist.

Another object of the present invention is to provide a document creating apparatus comprising a keyboard generating code data, converting means for converting the code data generated from the keyboard into character/symbol data related to at least one of characters and symbols, a handwritten data input device generating handwritten data, first image memory means for storing image data, second image memory means for storing the handwritten data, display memory means, developing means for developing the character/symbol data output from the converting means in the first image memory means, and generating means for generating displaying data for displaying a created document and to be stored in the display memory means from the data stored in the image memory means and the data stored in the second image memory means. According to the document creating apparatus of the present invention, the fair copy data Of the characters and/or symbols are treated as image data, similarly to the handwritten data, where the fair copy data are the image data specified by the code data. Hence, it is possible to create a document having a format in which the handwritten data and the fair copy data of the characters and/or symbols coexist.

Still another object of the present invention is to provide a document creating apparatus comprising a handwritten data input device generating handwritten data, extracting means for extracting a handwritten data block made up of an input unit of one or a plurality of handwritten data out of the handwritten data input from the handwritten data input device, assigning means for assigning a label written by one or a plurality of code data with respect to the handwritten data block extracted by the extracting means, managing means for managing management data related to a corresponding relationship of the label. assigned by the assigning means and the corresponding handwritten data, and retrieving means for retrieving handwritten data for which a retrieval request is made by referring to the management data of the managing means in response to the retrieval request for the handwritten data specifying the label thereof. According to the document creating apparatus of the present invention, it is possible to simply reuse the handwritten data of the created document.

A further object of the present invention is to provide a document creating apparatus comprising a handwritten data input device generating handwritten data, assigning means for assigning code data of character/symbol data with respect to an input unit of the handwritten data block generated from the handwritten data input device, the character/symbol data being related to at least one of characters and symbols, managing means for managing management data related to a corresponding relationship of the code data assigned by the assigning means and the corresponding input unit of the handwritten data, retrieving means for retrieving handwritten data corresponding to input code data if the input code data is registered in the managing means, and selecting means for selecting the handwritten data retrieved by the retrieving means as input data in place of the character/symbol data indicated by the input code data. According to the document creating apparatus of the present invention, it is possible to simply reuse the handwritten data of the created document.

Another object of the present invention is to provide a computer program product having a computer readable medium having computer program logic recorded thereon for performing document processing which creates a document in response to handwritten data generated from a handwritten data input device and displays the created document on a display screen, comprising setting means for setting on the display screen one or a plurality of normalized regions having a normalized size as an attribute and one or a plurality of non-normalized regions having no normalized size as the attribute, judging means for judging whether input data are input to the normalized region or the non-normalized region, first storing means, responsive to the judging means, for converting a size of the input data into a normalized size of the normalized region and storing the normalized input data in memory means when the judging means judges that the input data are input to the normalized region, and second storing means, coupled to the memory means and responsive to the judging means, for storing the input data in the memory means as they are when the judging means judges that the input data area input to the non-normalized region. According to the computer program product of the present invention, it is possible to create a document having a free format in which the handwritten data which are converted into the normalized size and the handwritten data which are not converted into the normalized size coexist.

Still another object of the present invention is to provide a computer program product having a computer readable medium having computer program logic recorded thereon for performing document processing which creates a document in response to handwritten data generated from a handwritten data input device and displays the created document on a display screen, comprising setting means for setting on the display screen a plurality of normalized regions having different normalized sizes, judging means for judging one of the normalized regions to which input data are input, storing means, responsive to the judging means, for converting a size of the input data into a normalized size of the normalized region judged by the judging means and storing the converted input data in memory means. According to the computer program product of the present invention, it is possible to create a document having a free format in which the handwritten data which are converted into different normalized sizes coexist.

A further object of the present invention is to provide a computer program product having a computer readable medium having computer program logic recorded thereon for performing document processing which creates a document in response to handwritten data generated from a handwritten data input device and displays the created document on a display screen, comprising a first input mode for inputting input data to a normalized region set on the display screen and storing the input data in memory means after converting a size of the input data into a normalized size, a second input mode for inputting the input data to a non-normalized region set on the display screen and storing the input data in the memory means without converting the size of the input data into the normalized size, and setting changing means for cancelling the input mode in at least a portion of the region to which the input data are input in one of the first and second input modes, and changing the cancelled portion into a region to which an input is made in the other of the first and second input modes. According to the computer program product of the present invention, it is possible to create a document having a free format in which the handwritten data which are converted into the normalized size and the handwritten data which are not converted into the normalized size coexist.

Another object of the present invention is to provide a computer program product having a computer readable medium having computer program logic recorded thereon for performing document processing which creates a document in response to handwritten data generated from a handwritten data input device and displays the created document on a display screen, comprising storing means for storing input data in the memory means after converting a size of the input data into a normalized size, and setting changing means for cancelling the normalized size used to input the input data in at least a portion of a data input region on the display screen, and setting a data input region having another normalized size within the cancelled. portion. According to the computer program product. of the present invention, it is possible to create a document having a free format in which the handwritten data which are converted into different normalized sizes coexist.

Still another object of the present invention is to provide a computer program product comprising converting means for converting code data generated from a keyboard into character/symbol data related to at least one of characters and symbols, and generating means for generating displaying data for displaying handwritten data by changing a size of the handwritten data generated from a handwritten data input device to a size of the character/symbol data output from the converting means. According to the computer program product of the present invention, the input unit of the handwritten data and the input unit of the fair copy data of the characters and/or symbols are defined in the block of the same size, so that it is possible to create a document having a format in which the handwritten data and the fair copy data of the characters and/or symbols coexist. The fair copy data are the image data specified by the code data.

A further object of the present invention is to provide a computer program product comprising converting means for converting code data generated from a keyboard into character/symbol data related to at least one of characters and symbols, normalizing means for generating displaying data for displaying handwritten data by normalizing a size of the handwritten data generated from a handwritten data input device, and generating means for generating displaying data for displaying the character/symbol data by changing a size of the character/symbol data output from the converting means to a size of the handwritten data output from the normalizing means. According to the computer program product of the present invention, the input unit of the handwritten data and the input unit of the fair copy data of the characters and/or symbols are defined in the block of the same size, so that it is possible to create a document having a format in which the handwritten data and the fair copy data of the characters and/or symbols coexist. The fair copy data are the image data specified by the code data.

Another object of the present invention is to provide a computer program product comprising converting means for converting code data generated from a keyboard into character/symbol data related to at least one of characters and symbols, developing means for developing the character/symbol data output from the converting means in image memory means, and displaying means for generating displaying data for displaying a created document and to be stored in the display memory means from data stored in image memory means for storing handwritten data. According to the computer program product of the present invention, the fair copy data of the characters and/or symbols are treated as image data, similarly to the handwritten data, where the fair copy data are the image data specified by the code data. Hence, it is possible to create a document having a format in which the handwritten data and the fair copy data of the characters and/or symbols coexist.

Still another object of the present invention is to provide a computer program product comprising converting means for converting code data generated from a keyboard into character/symbol data related to at least one of characters and symbols, developing means for developing the character/symbol data output from the converting means in first image memory means, and generating means for generating displaying data for displaying a created document and to be stored in display memory means from the data stored in the image memory means and data stored irk second image memory means for storing handwritten data. According to the computer program product of the present invention, the fair copy data of the characters and/or symbols are treated as image dates, similarly to the handwritten data, where the fair copy data are the image data specified by the code data. Hence, it is possible to create a document having a format in which the handwritten data and the fair copy data of the characters and/or symbols coexist.

A further object of the present invention is to provide a computer program product comprising extracting means for extracting a handwritten data block made up of an input unit of one or a plurality of handwritten data out of the handwritten data input from a handwritten data input device, assigning means for assigning a label written by one or a plurality of code data with respect to the handwritten data block. extracted by the extracting means, managing means for managing management data related to a corresponding relationship of the label assigned by the assigning means and the corresponding handwritten data, and retrieving means for retrieving handwritten data for which a retrieval request is made by referring to the management data of the managing means in response to the retrieval request for the handwritten data specifying the label thereof. According to the computer program product of the present invention, it is possible to simply reuse the handwritten data of the created document.

Another object of the present invention is to provide a computer program product comprising assigning means for assigning code data of character/symbol data with respect to an input unit of handwritten data block generated from a handwritten, data input device, the character/symbol data being related to at least one of characters and symbols, managing means for managing management data related to corresponding relationship of the code data assigned by the assigning means and the corresponding input unit of the handwritten data, retrieving means for retrieving handwritten data corresponding to input code data if the input code data is registered in the managing means, and selecting means for selecting thea handwritten data retrieved by the retrieving means as input data in place of the character/symbol data indicated by the input code data. According to the computer program product of the present invention, it is possible to simply reuse the handwritten data of the created document.

Other objects and further features of the present invention will be apparent from the following detailed description when read in conjunction with the accompanying drawings.

BRIEF DESCRIPTION OF THE DRAWINGS

FIG. 25 is a flow chart for explaining the operation of the document processing mechanism of the second embodiment;

FIG. 32 is a diagram for explaining management data of an image dictionary; and

FIG. 33 is a diagram for explaining the process of the third embodiment.

DESCRIPTION OF THE PREFERRED EMBODIMENTS

A description will be given of a first aspect of the present invention, by referring to FIG. 1. A document creating apparatus 1 shown in FIG. 1 creates a document in response to handwritten data which are generated by a handwritten data input device 10.

In this specification, the "document" to be created may consist of one or more characters, symbols or spaces, one or more words, one or more sentences, graphics and the like.

Figure 1:
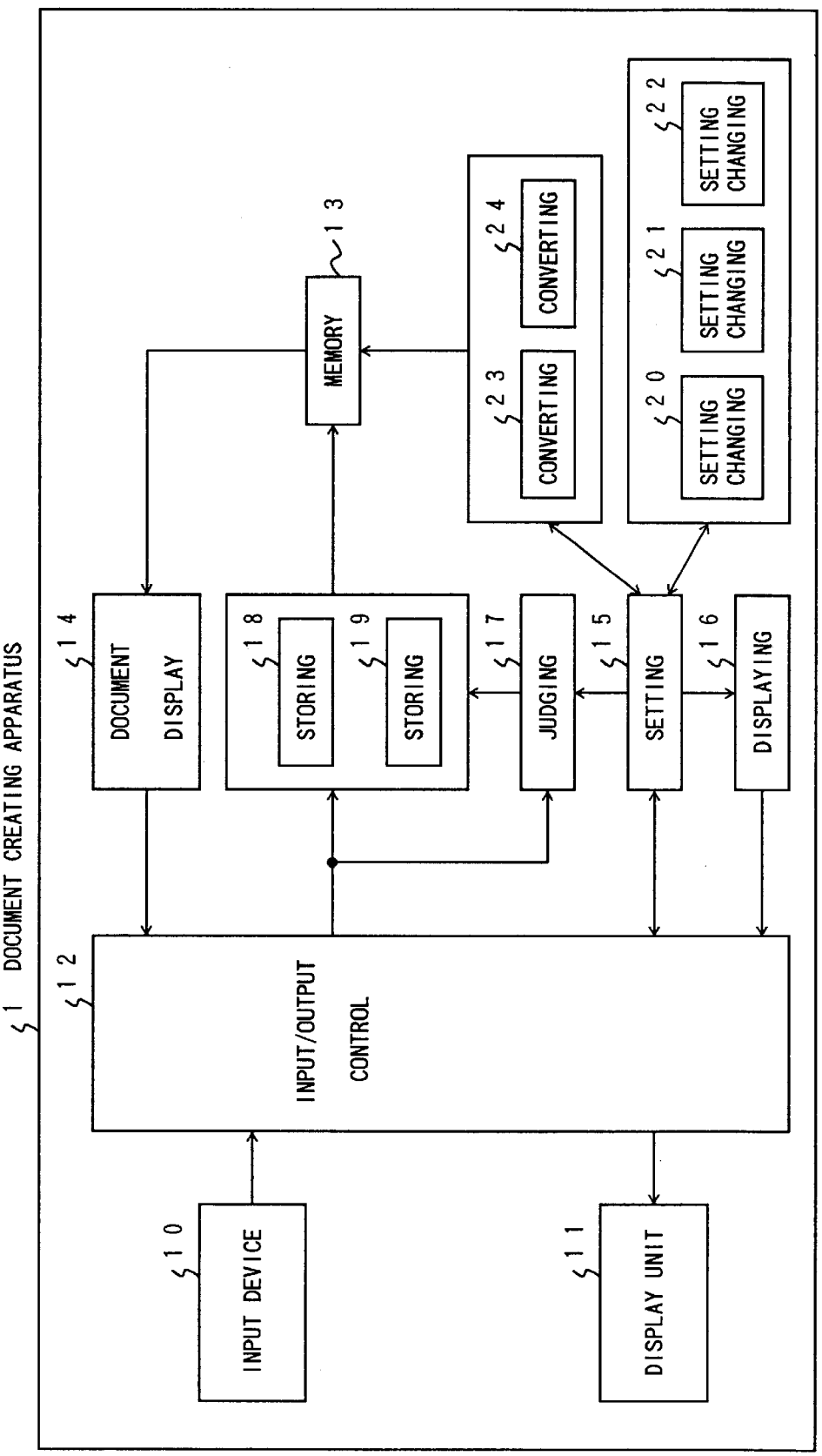
FIG. 1 is a system block diagram for explaining a first aspect of the present invention.

In FIG. 1, the document creating apparatus 1 includes the handwritten data input device 10, a display unit 11, an input/output control means 12, a memory 13, a document display means 14, a setting means 15, a displaying means 16, a judging means 17, a first storing means 18, a second storing means 19, a first setting changing means 20, a second setting changing means 21, a third setting changing means 22, a first converting means 23 and a second converting means 24.

The handwritten data input deice 10 generates handwritten data in units of the input unit. The display unit 11 displays a created document on a display screen. The input/output control means 12 carries out an interface process between the handwritten data input device 10 and the display unit 11. The memory 13 stores the created document. The document display means 14 displays the created document stored in the memory 13 on the display unit.

The setting means 15 sets on the display screen one or a plurality of normalized regions having the normalized size as the attribute and one or a plurality of non-normalized regions having no normalized size as the attribute. The displaying means 16 displays the normalized and non-normalized regions on the display screen using different display formats. The judging means 17 judges whether the input data are input to the normalized region or thea non-normalized region.

The first storing means 18 converts the size of the input data to the normalized size of the normalized region if the judging means 17 judges that the input data are input to the normalized region, and stores the converted input data in the memory 13. The second storing means 19 stores the input data in the memory 13 as they are if the judging means 17 judges that the input data are input to the non-normalized region.

After the data input is made, the first setting changing means 20 cancels a portion or all portions of the normalized region and changes the cancelled portion into a non-normalized region. On the other hand, after the data input is made, the second setting changing means 20 cancels a portion or all portions of the non-normalized region and changes the cancelled portion into a normalized region. In addition, after the data input is made, the third setting changing means 22 cancels the normalized size of the normalized region at a portion or all portions within the normalized region, and sets a normalized region having another normalized size in the cancelled region.

Further, after the data input is made, the first converting means 23 converts the region size of the normalized region or the non-normalized region into a specified size, and converts the size of all of the data of the converted region stored in the memory 13 depending on the converted region size. On the other hand, after the data input is made, the second converting means 24 converts the size of a portion of the in-region data within the normalized region or the non-normalized region stored in the memory 13 into it specified size.

Therefore, in the document creating apparatus I shown in FIG. 1, the setting means 15 sets on the display screen the normalized region having the normalized size as the attribute and the non-normalized region having no normalized size as the attribute. In response to the setting of these normalized and non-normalized regions, the judging means 17 judges whether the input data are input to the normalized region or are input to the non-normalized region. When the judging means 17 judges that the input data are input to the normalized region, the first storing means 18 converts the size of the input data to the normalized size of the normalized region, and stores the converted input data in the memory 13. On the other hand, when the judging means 17 judges that the input data are input to the non-normalized region, the second storing means 19 stores the input data in the memory 13 as they are.

When carrying out this document creating process, it is possible to input handwritten data which are not converted into the normalized size to the region which was up to then treated as the normalized region, in accordance with the process of the first setting changing means 20. In addition, it is possible to input handwritten data which are converted into the normalized size to the region which was up to the treated as the non-normalized region, in accordance with the process of the second setting changing means 21. Furthermore, it is possible to input handwritten data which are converted into a normalized size different from the normalized size which was used up to then to the normalized region, in accordance with the process of the third setting changing means 22.

It is also possible to enlarge and reduce the input normalized region and non-normalized region in accordance with the process of the first converting means 23. Moreover, it is possible to enlarge and reduce a portion of the in-region data which are within the normalized region or the non-normalized region, in accordance with the process of the second converting means 24.

Therefore, according to the document creating apparatus 1 shown in FIG. 1, it is possible to create a document having a free format in which the: handwritten data which are converted into the normalized size and the handwritten data which are not converted into the normalized size coexist.

According to the document creating apparatus shown in FIG. 1 employing the first aspect of the present invention, the setting means 15 is provided to set the normalized region and the non-normalized region on the document creating screen, in order to solve the problem of the prior art, that is, the problem in that it was impossible to create a document having a free format in which the handwritten data which are converted into the normalized size and the handwritten data which are not converted into the normalized size coexist. However, instead of providing the setting means 15, the problem of the prior art can be solved by providing the first setting changing means 20 when only the normalized region is set on the document creating screen. Similarly, instead of providing the setting means 15, the problem of the prior art can be solved by providing the second setting changing means 21 when only the non-normalized region is set on the document creating screen.

Figure 2:
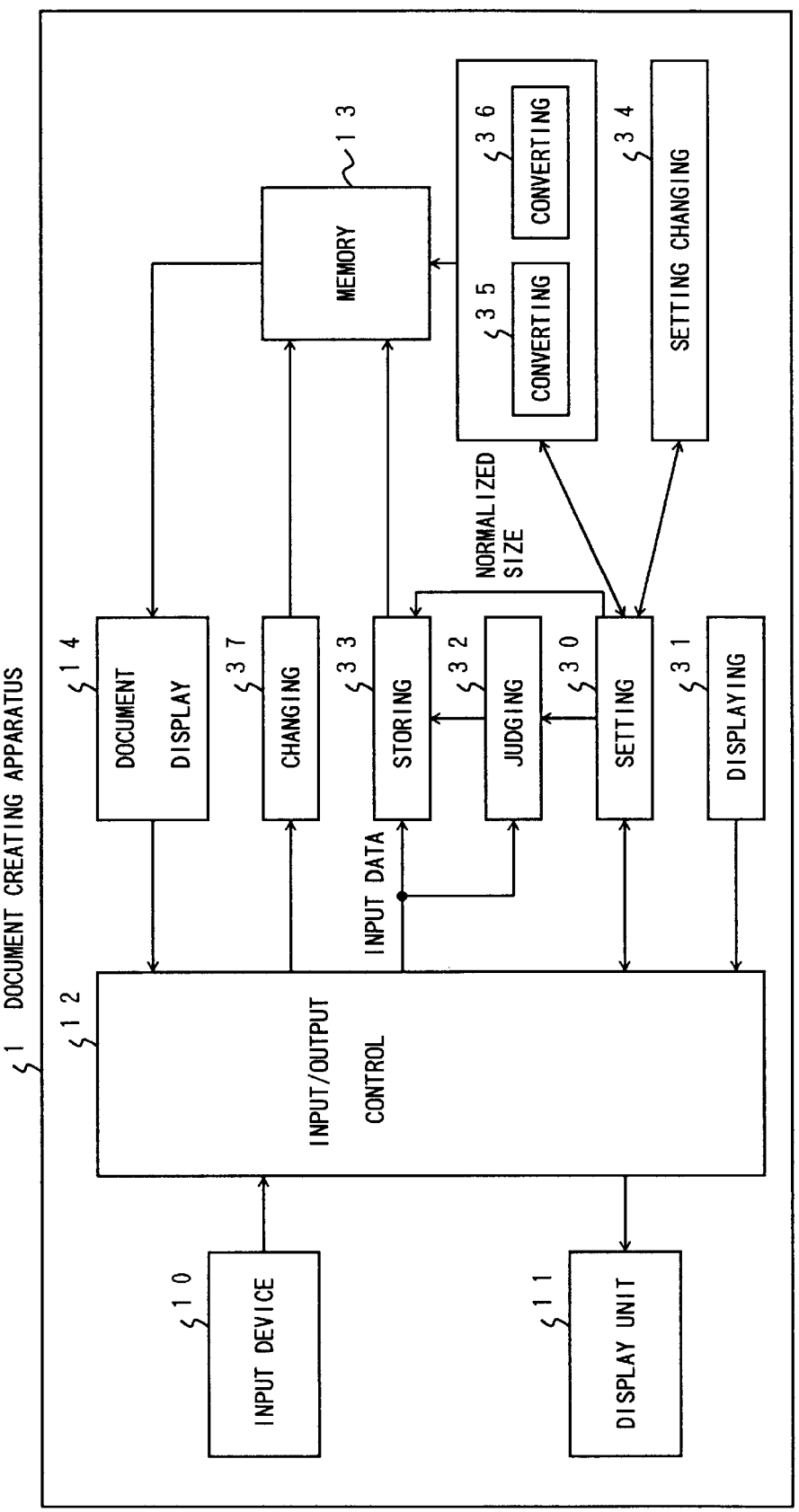
FIG. 2 is a system block diagram for explaining a second aspect of the present invention.

Next a description will be given of a second aspect of the present invention, by referring to FIG. 2. The document creating apparatus 1 shown in FIG. 2 creates a document in response to handwritten data which are generated by the handwritten data input device 10. In FIG. 2, those parts which are the same as those corresponding parts in FIG. 1 are designated by the same reference numerals, and a description thereof will be omitted.

In addition to the hand written data input device 10, the display unit 11, the input/output control means 12, the memory 13 and the document display means 14, the document creating apparatus 1 shown in FIG. 2 includes a setting means 30, a displaying means 31, a judging means 32, a storing means 33, a setting changing means 34, a first converting means 35, a second converting means 36, and a changing means 37.

The setting means 30 sets on the display screen a plurality of normalized regions having different normalized sizes. The displaying means 31 displays each normalized region with a different display format on the display screen. The judging means 32 judges one of the normalized regions to which the input data are input. The storing means 33 converts the size of the input data into the normalized size of the normalized region judged by the judging means 32 and stores the converted input data in the memory 13. The setting changing means 34 cancels the normalized size of the normalized region within a portion or all portions of the normalized region after the data input is made, and sets a normalized region having another normalized size within the cancelled region.

After the data input is made, the first converting means 35 converts the region size of the normalized region into a specified size, and converts the size of all of the data of the converted normalized region stored in the memory 13 depending on the conversion of the region size. On the other hand, after the data input is made, the second converting means 36 converts the size of the in-region data within the normalized region stored in the memory 13 into a specified size.

The changing means 37 changes the size of the data to be moved or copied to another normalized region or the data of the normalized region which becomes the destination of the move or copy and stored in the memory 13, so that the sizes of both of these data become the same.

Therefore, in this document creating apparatus 1 shown in FIG. 2, the setting means 30 sets on the display screen the plurality of normalized regions having different normalized sizes, and responsive to the normalized regions which are set, the judging means 32 judges one of the normalized regions to which the input data are input. Responsive to the judgement of the judging means 32, the storing means 33 converts the size of the input data into the normalized size of the normalized region judged by the judging means 32 and stores the converted input data in the memory 13.

When carrying out the document creating process, it is possible to input in each normalized region the handwritten data which are converted into a normalized size different from the normalized size used up to then, in accordance with the process of the setting changing means 34. In addition, it is possible to enlarge and reduce the input normalized region in accordance wit the process of the first converting means 35. Furthermore, it is possible to enlarge and reduce a portion of the in-region data within the input normalized region, in accordance with the process of the second converting means 36.

Hence, according to the document creating apparatus 1 shown in FIG. 2, it is possible to create a document having a free format in which the handwritten data which are converted into different normalized sizes coexist.

According to the document creating apparatus 1 shown in FIG. 2 employing the second aspect of the present invention, the setting means 30 is provided to set the plurality of normalized regions having different normalized sizes on the document creating screen, in order to solve the problem of the prior art, that is, the problem in that it was impossible to create the document having the free format in which the handwritten data converted into different normalized sizes coexist. However, instead of providing the setting means 30, it is possible to provide the setting changing means 34 so that the problem of the prior art is solved even when only one normalized region is set on the document creating screen.

Figure 3:
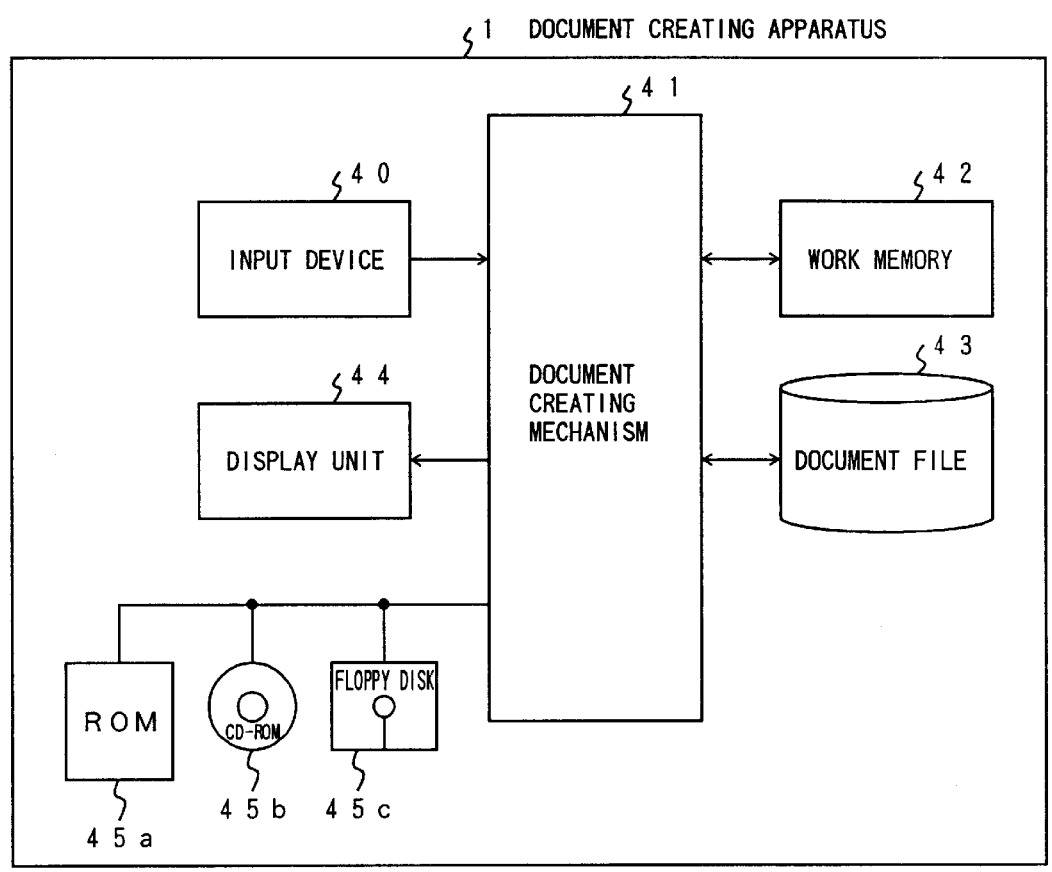
FIG. 3 is a system block diagram showing a first embodiment of a document creating apparatus according to the present invention.

Next, a description will be given of a first embodiment of the document creating apparatus according to the present invention. FIG. 3 is a system block diagram showing the first embodiment. This first embodiment employs the first aspect and/or the second of the present invention described above.

The document creating apparatus 1 shown in FIG. 3 includes a handwritten data input device 40, a document creating mechanism 41, a work memory 42, a document file 43, a display unit 44, and storage media 45a through 45c.

In this embodiment, the storage media 45a, 45b and 45c respectively are a ROM, a CD-ROM and a floppy disk, but the type of storage medium is of course not limited to such. The document creating mechanism 41 includes an internal memory and a central processing unit (CPU) which carries out various functions based on programs which are read from at least one of the storage media 45a through 45c and stored in the internal memory. The illustration of a CD-ROM drive which plays the CD-ROM 45b and a floppy disk drive which plays the floppy disk 45c is omitted in FIG. 3 because such drives are well known.

The present invention includes a computer program product which is a storage medium, such as the storage media 45a through 45c, including instructions which can be used to program a computer to perform a process of the invention, that is, the process of the document creating apparatus 1. The storage medium can include, but is not limited to, any type of disk including hard disks, floppy disks, optical disks, CD-ROMs, and magneto-optical disks, ROMs, RAMS, EPROMs, EEPROMS, SRAMS, f lash memories, magnetic or optical cards, or any type of media suitable for storing electronic instructions.

The handwritten data input device 40 generates handwritten characters, symbols and graphics (hereinafter simply referred to as handwritten data) depending on an input unit, and issues a document create command or the like. The document creating mechanism 41 carries out a document creating process in response to the handwritten data and command received from the handwritten data input device 40. The work memory 42 temporarily stores the document which is being created. The document file 43 stores the created document. The display unit 44 has a display screen for displaying the document which is developed in the work memory 42.

Of course, it is possible to use a known handwritten data input device for the handwritten data input device 40 and a known display unit for the display unit 44.

Figure 4:
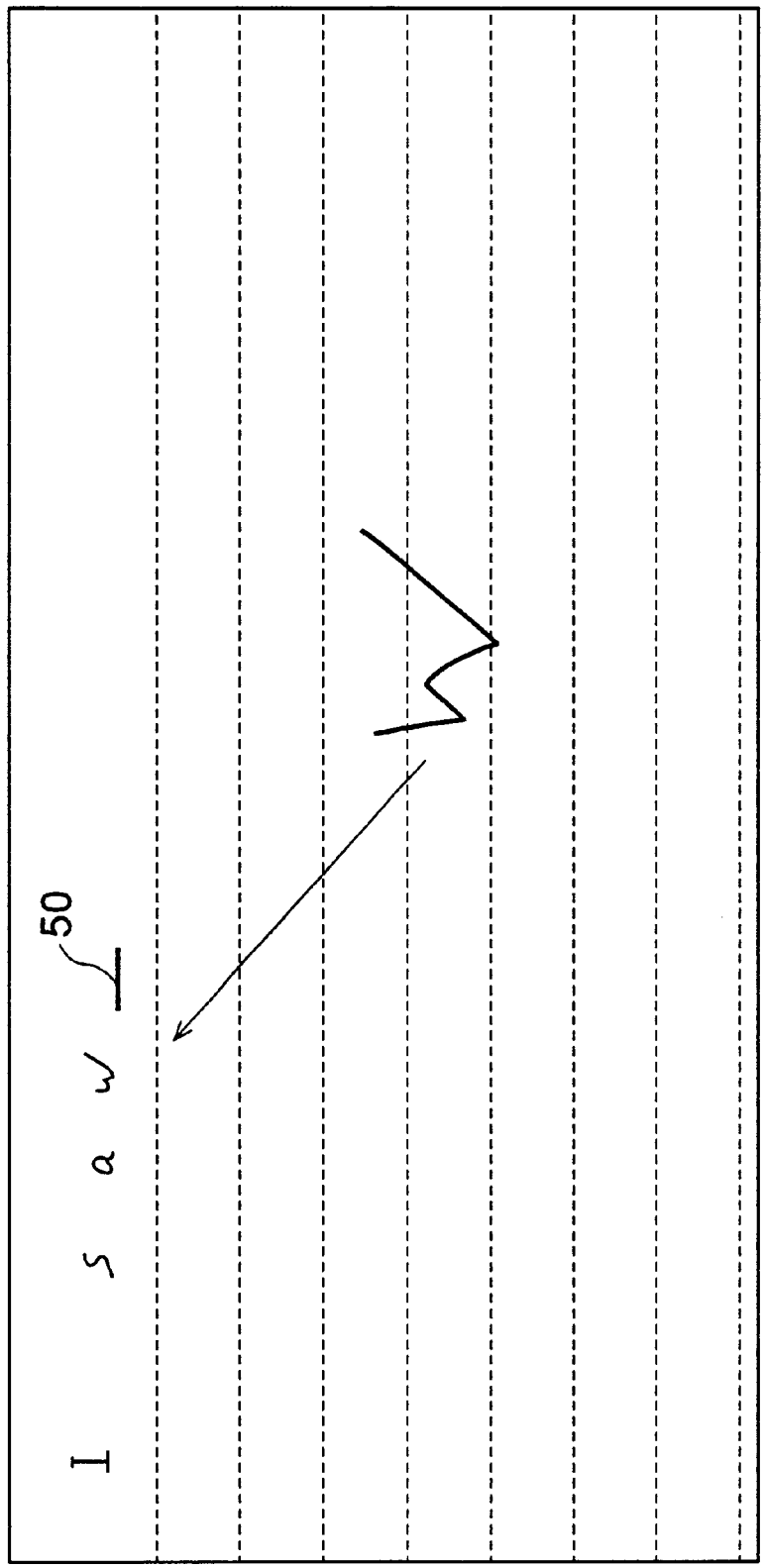
FIG. 4 is a diagram for explaining a normalized region.
Figure 5:
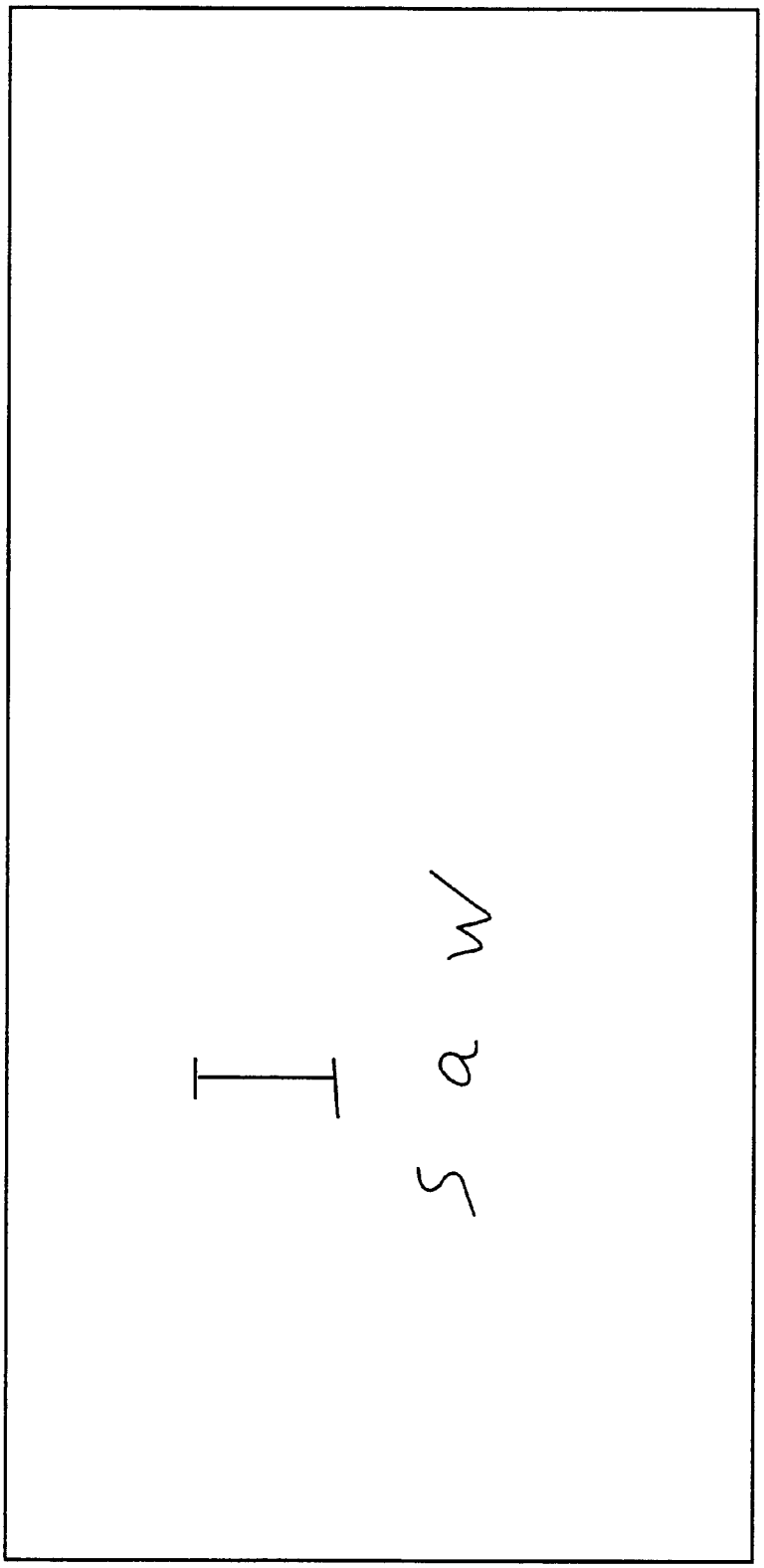
FIG. 5 is a diagram for explaining a nonnormlized region.

The document creating mechanism 41 carries out the document creating process by setting two kinds of document input regions, that is, the normalized region and the normalized region, on the display screen. When inputting the handwritten characters in the normalized region, for example, the handwritten characters are temporarily displayed as shown in FIG. 4, for example, and the handwritten characters are converted into the normalized size by enlarging or reducing the character size, and the converted handwritten characters are arranged in a line and stored in the work memory 42 on one hand and displayed on the display screen on the other. On the other hand, when inputting the handwritten characters in the non-normalized region, the handwritten characters are stored in the work memory 42 as they are on one hand and displayed on the display screen as shown in FIG. 5, for example.

In FIG. 4, a cursor 50 indicates the storage position of the handwritten character which is next input, and this cursor 50 is movable to an arbitrary position within the normalized region based on an instruction from the user. In addition, the document creating mechanism 41 also has a function of displaying the normalized region and the non-normalized region in an identifiable or distinguishable manner, by displaying or not displaying lines on which the characters are arranged, displaying the normalized and normalized regions using different colors and the like.

Next, a description will be given of the operation of the document creating mechanism 41 of this first embodiment, by referring to FIGS. 6 through 10. FIGS. 6 through 10 respectively are flow charts for explaining the operation of the document creating mechanism 41.

Figure 6:
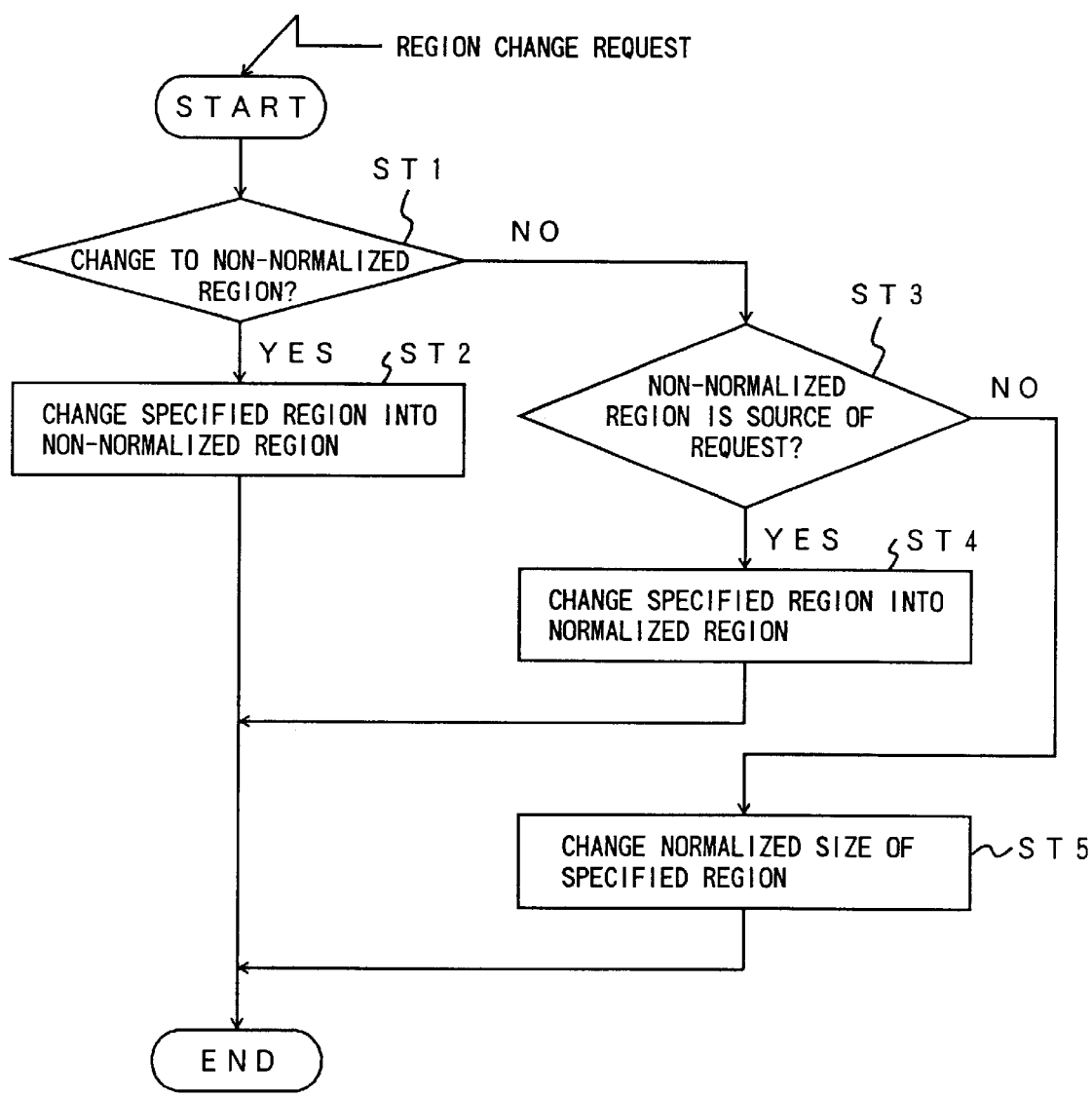
FIG. 6 is a flow chart for explaining the operation of the first embodiment responsive to a region change request.

FIG. 6 is a flow chart for explaining the operation of the document creating mechanism 41 responsive to a region change request. When the region change request is made by the user at the start of the document creating process, the document creating mechanism 41 decides in a step ST1 whether or not the region change request requests a change to the non-normalized region.

In other words, when the document creating screen is defined by the normalized region at the start of the document creating process, the user creates the document by changing a portion or all portions of the normalized region into the non-normalized region or by changing the normalized region into a normalized region having another normalized size. In addition, when the document creating screen is defined by the non-normalized region at the start of the document creating process, the user creates the document by changing a portion or all portions of the non-normalized region into the normalized region. Hence, the step ST1 decides whether the region change request requests the change to the normalized region or the non-normalized region.

If the region change request requests the change to the non-normalized region and the decision result in the step ST1 is YES, a step ST2 changes the region specified by the user from the normalized region into the non-normalized region, and the process ends.

On the other hand, if the region change request requests the change to the normalized region and the decision result in the step ST1 is NO, a step ST3 decides whether or not the non-normalized region is the source of the region change request. If the decision result in the step ST3 is YES, that is, if the region change request requests the change from the non-normalized region to the normalized region, the process advances to a step ST4. The step ST4 changes the region which is specified by the user from the non-normalized region to the normalized region by assigning the normalized size specified by the user with respect to the region which is specified by the user, and the process ends.

On the other hand, if the decision result in the step ST3 is NO, that is, if the region change request requests the change from the normalized region to another normalized region, the process advances to a step ST5. The step ST5 changes the region which iLs specified by the user to the other normalized region having a different normalized size by assigning the normalized size specified by the user with respect to the region which is specified by the user, and the process ends. The default value of the normalized size and the changing value of the default value specified by the user are assigned to the normalized region which is the source of the region change request.

Figure 11A:
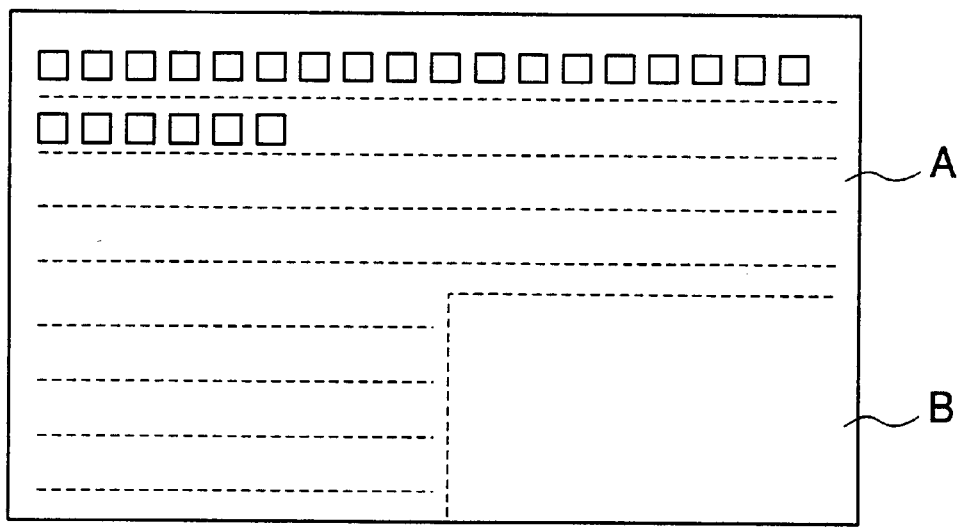
FIGS. 11A and 11B respectively are diagrams for explaining a document create screen setting process.
Figure 11B:
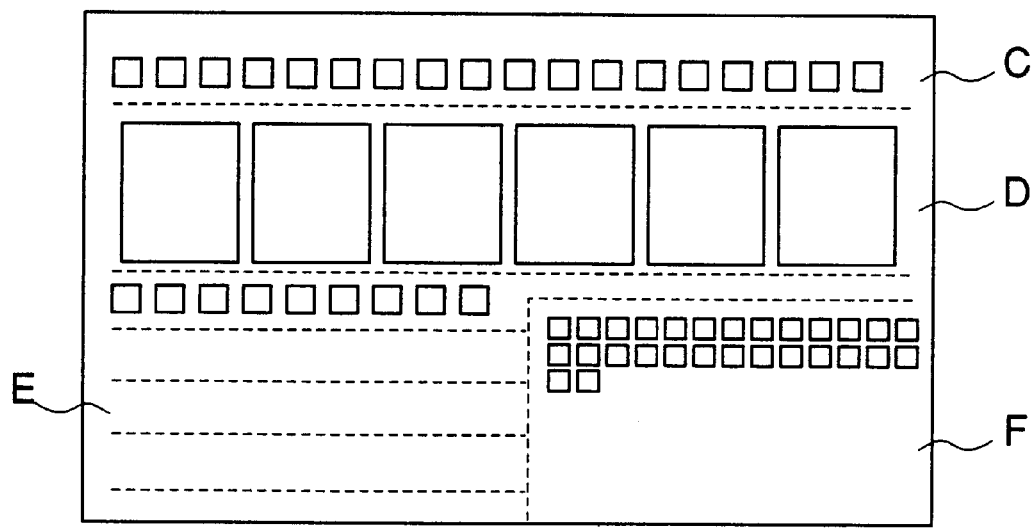

Accordingly, when the region change request is made by the user at the start of the document creating process, the document creating mechanism 41 carries out the process show in FIG. 6, so as to set a document creating screen shown in FIG. 11A with a format in which a normalized region A and a non-normalized region B coexist or, to set a document creating screen shown in FIG. 11B with a format in which normalized regions C, D and E having different normalized sizes coexist.

Figure 7:
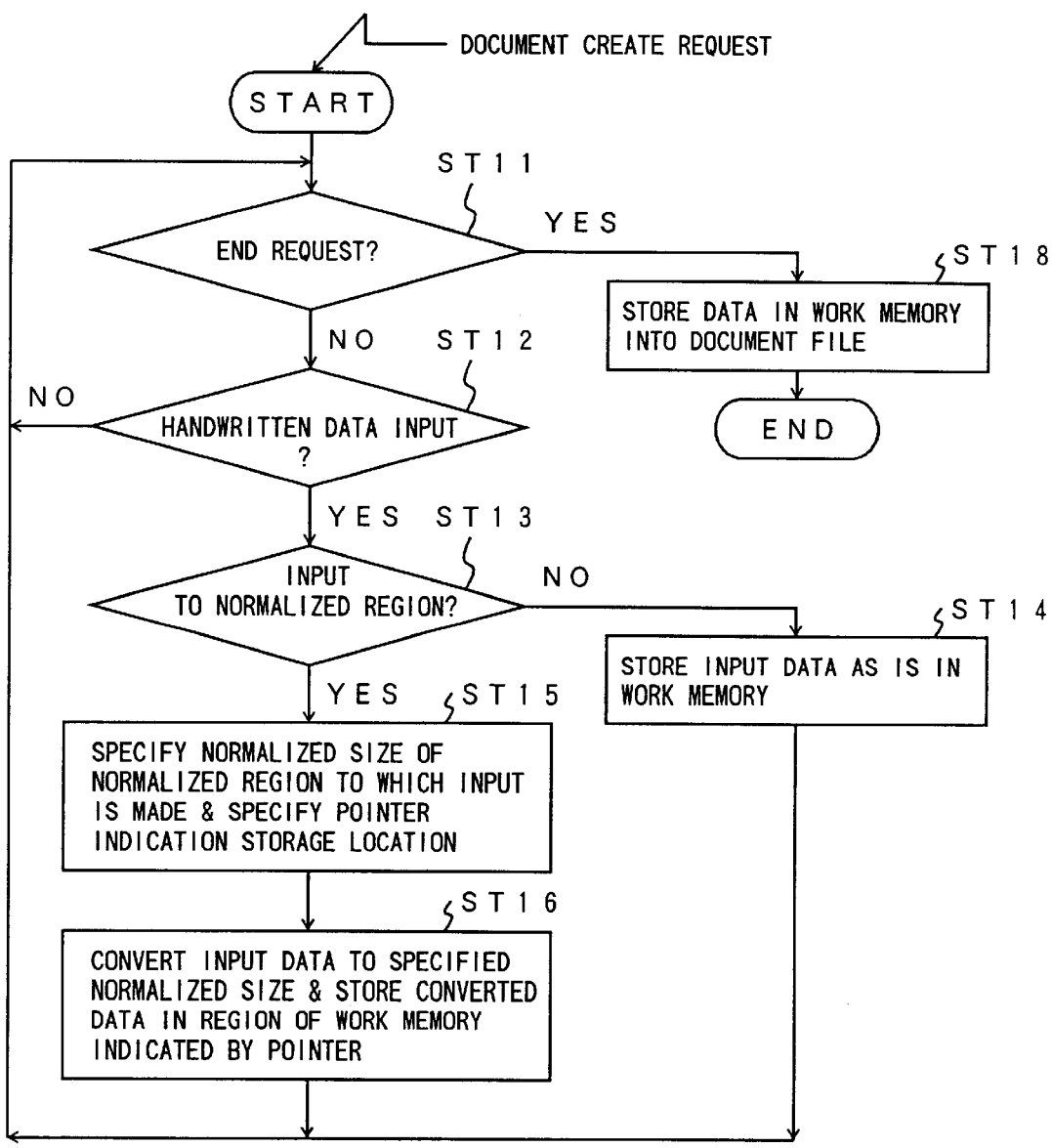
FIG. 7 is a flow chart for explaining the operation of the first embodiment responsive to a document create request.

FIG. 7 is a flow chart for explaining the operation of the document creating mechanism 41 responsive to a document create request. When the document create request is made by the user after carrying out the process of setting the document creating screen, the document creating mechanism 41 decides whether or not a create end request is made by the user in a step ST11. If the create end request is not made by the user and the decision result in the step ST11 is NO, a step ST12 decides whether or not the handwritten data are input from the handwritten data input device 40. The process returns to the step ST11 if the decision result in the step ST12 is NO.

If the decision result in the step ST12 becomes YES, a step ST13 decides whether or not the handwritten data are input to the normalized region. If the handwritten data are input to the non-normalized region and the decision result in the step ST13 is NO, a step ST14 stores the handwritten data in the work memory 42 as it is without subjecting the same to a normalization, and the process returns to the step ST11 so as to continue inputting the handwritten data.

On the other hand, if the decision result in the step ST13 is YES, a step ST15 specifies the normalized size of the normalized region to which the input is made, and specifies the pointer which indicates the storage location of the handwritten data in the normalized region to which the input is made. In this case, the pointer points the storage region in the work memory 42 indicated by the cursor 50 shown in FIG. 4.

Then, a step ST16 converts the handwritten data which are input into the specified normalized size, and stores the converted handwritten data in the storage region of the work memory 42 indicated by the specified pointer. In addition, a step ST17 updates the pointer, and the process returns to the step ST11 so as to continue inputting the handwritten data.

If the user makes the create end request and the decision result in the step ST11 is YES, a step ST18 stores the document stored in the work memory 42 into the document file 43, and the process ends.

Accordingly, when the document create request is made by the user, the document creating mechanism 41 carries out the process shown in FIG. 7, so as to receive the handwritten data input by the user from the handwritten data input device 40. When the input handwritten data are to be input to the normalized region, the document is created by converting the handwritten data into the normalized size, arranging the converted handwritten data in a line and storing the same in the work memory 42. On the other hand, when the input handwritten data are to be input to the non-normalized region, the document is created by storing the handwritten data in the work memory 42 as they are.

Therefore it is possible to create a document having a free format in which the handwritten data which are converted into the normalized size and the handwritten data which are not converted into the normalized size coexist. In addition, it is possible to create a document having a free format in which the handwritten data which are converted into different normalized sizes coexist.

Although the illustration thereof is omitted in FIG. 7, the document creating mechanism 41 includes a document editing function similar to that of the conventional document creating apparatus. Hence, the document creating mechanism 41 can create a document by editing the document stored in the work memory 42 using the document editing function.

In order to enable a document having an even freer format when carrying out the document creating process, the document creating mechanism 41 is also provided with functions of changing a portion or all portions of the normalized region into the non-normlized region, changing a portion of all portions of the normalized region into a normalized region having another normalized size, and changing a portion or all portions of the non-normalized region into the normalized region, after the handwritten data are input.

The region may be changed by such functions by carrying out a process similar to that shown in FIG. 6.

In other words, when the region change request is made by the user after the handwritten data are input, the document creating mechanism 41 decides whether or not the region change request requests the change to the non-normalized region, similarly to the step ST1 show in FIG. 6. If the decision result is YES, the process advances to a step similar to the step ST2 and changes the region specified by the user from the normalized region into the non-normalized region.

On the other hand, if the decision result of the step similar to the step ST1 is NO, the process advances to a step similar to the step ST3 to decide whether or not the non-normalized region is the source of the region change request. If the decision result of the step similar to the step ST3 is YES, the process advances to a step similar to the step ST4 to change the region specified by the user from the non-normalized region into the normalized region by assigning the normalized size specified by the user with respect to the region which is specified by the user.

On the other hand, if the decision result in the step similar to the step ST3 is NO, the process advances to a step similar to the step ST5, so as to change the region which is specified by the user to the normalized region having a different normalized size by assigning the normalized size specified by the user with respect to the region which is specified by the user.

Figure 12A:
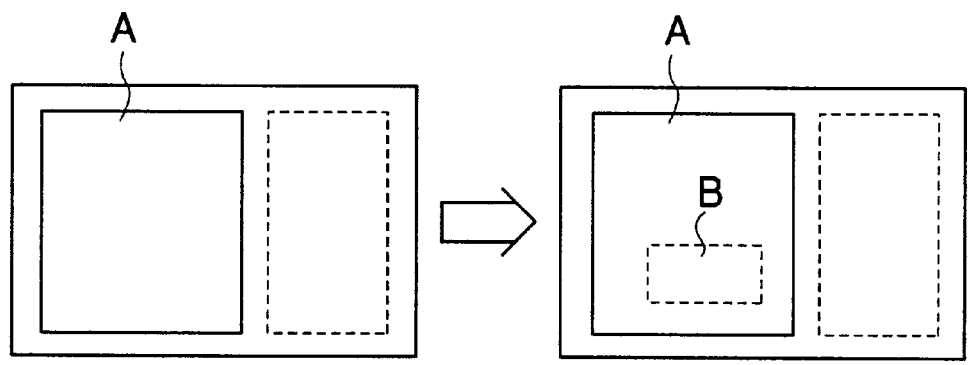
FIGS. 12A through 12C respectively are diagrams for explaining a document create screen setting change process.
Figure 12B:
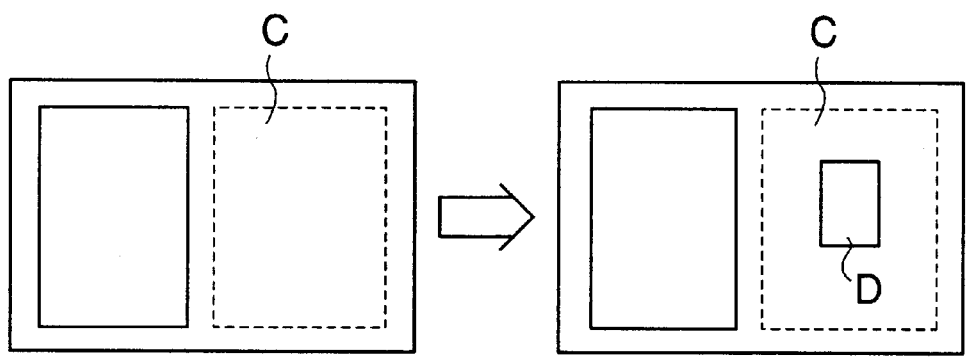
Figure 12C:
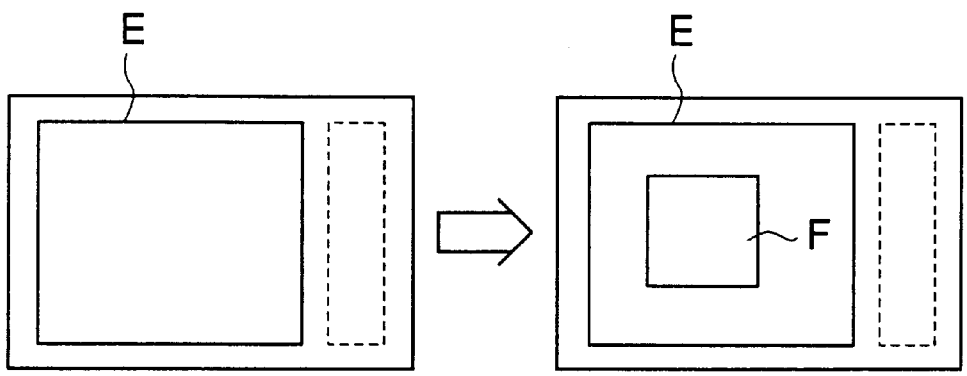

Accordingly, when the region change request is made by the user after the handwritten data are input, the document creating mechanism 41 carries out the process similar to that shown in FIG. 6, so as to effect the changes shown in FIGS. 12A through 12C. FIG. 12A shows a case where a portion of the normalized region A which is set before the handwritten data are input is changed into the non-normalized region B. FIG. 12B shows a case where a portion of the non-normalized region C which is set before the handwritten data are input is changed into the normalized region D. In addition, FIG. 12C shows a case where a portion of the normalized region E which is set before the handwritten data are input is changed into the normalized region F having a different normalized size.

Figure 13A:
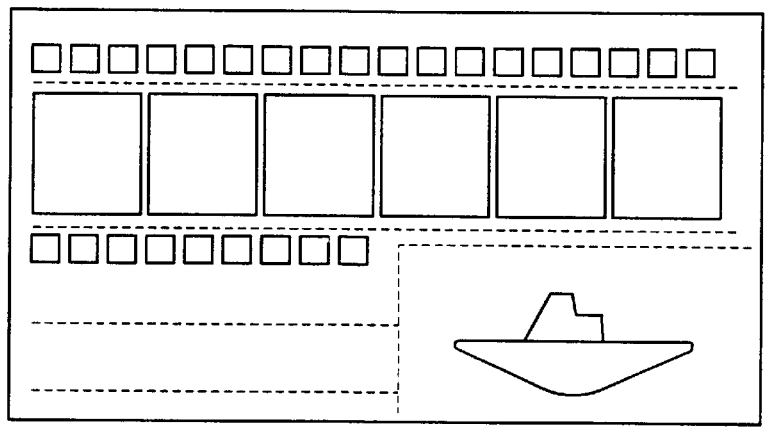
FIGS. 13A and 13B respectively are diagrams for explaining a created document.
Figure 13B:
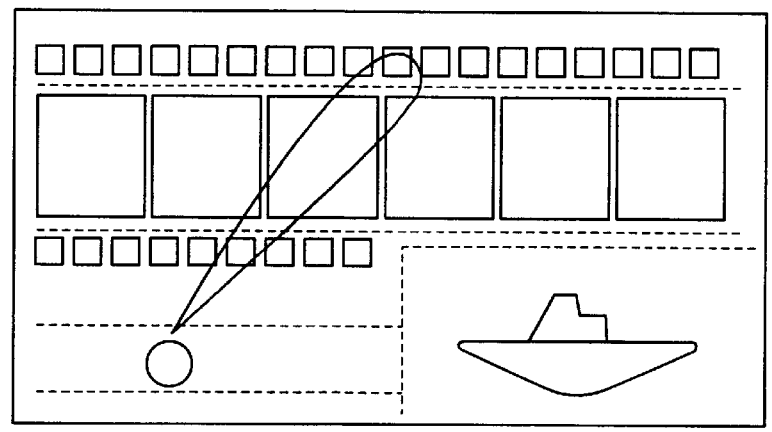

Therefore, by the provision of these functions of the document creating mechanism 41, it is possible to create a document having an even freer format. For example, the function of changing the normalized region which is set before the handwritten data are input into the non-normalized region enables an overwrite on the document shown in FIG. 13A as shown in FIG. 13B. In other words, by enabling the overwrite on the document which is created in the normalized region shown in FIG. 13A, it becomes possible to write handwritten data having the non-normalized size as shown in FIG. 13B, where an exclamation mark "!" is the handwritten data that is overwritten on document which is created in the normalized region. As a result, it is possible to create a document having an extremely free format.

In order to change the non-normalized region into the normalized region, it is necessary to set the position of the cursor 50 shown in FIG. 4. However, in general, the cursor 50 is uniquely set by the system or set responsive to the user's instruction.

As described above, the document creating mechanism 41 also has the function of creating the document by editing the document stored in the work memory 42. Hence, a description will hereinafter be made with respect to some of the editing functions peculiar to the present invention.

The document creating mechanism 41 may set a plurality of normalized regions having different normalized sizes. For this reason, measures must be taken to enable copying or moving of the normalized handwritten data between the normalized regions having different normalized sizes. These measures are realized by the process shown in FIG. 8.

Figure 8:
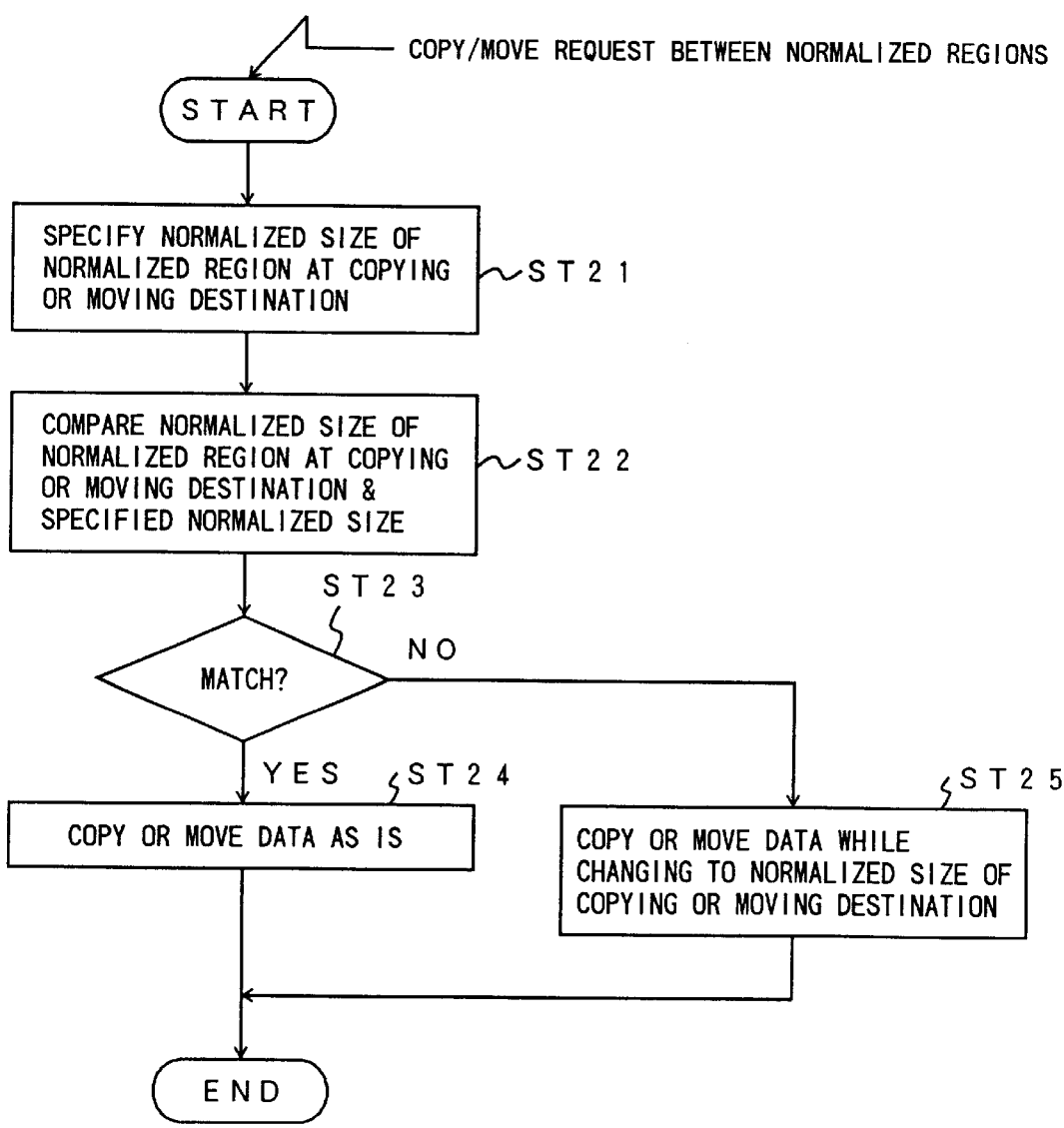
FIG. 8 is a flow chart for explaining the operation of the first embodiment responsive to a data copy/move request between normalized regions.

FIG. 8 is a flow chart for explaining the operation of the document creating mechanism 41 responsive to a data copy/move request between the normalized regions. When the user issues a data copy/move request which requests data to be copied or moved between the normalized regions, the document creating mechanism 41 specifies the normalized size of the normalized region at the copying or moving destination in a step ST21. Then, the normalized size of the normalized region at the copying or moving source and the normalized size specified in the step ST21 are compared in a step ST22. A step ST23 decides whether or not the two compared normalized sizes match. If the decision result in the step ST23 is YES, a step ST24 copies or moves the data as they are, and the process ends. On the other hand, if the decision result in the step ST23 is NO, a step ST25 carries out the copying or moving process while changing the normalized size of the data to the normalized size specified in the step ST21.

Hence, when copying or moving the data between the normalized regions having different normalized sizes, it is possible to prevent the data size from becoming different at the copying or moving destination. In the process shown in FIG. 8, the data size is adjusted to the normalized size at the copying or moving destination, however, it is of course possible to adjust the data size to the normalized size at the copying or moving source.

The document creating mechanism 41 is also provided with a function of enlarging or reducing the region size of the normalized region or the non-normalized region after the handwritten data are input, and a function of enlarging or reducing a portion of the in-region data within the normalized region or the non-normalized region. Accordingly, it is possible to create a document having an extremely free format.

Figure 9:
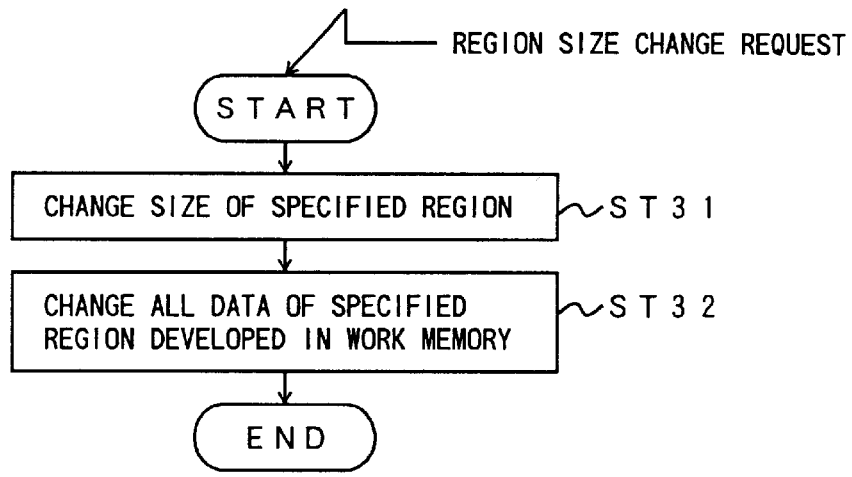
FIG. 9 is a flow chart for explaining the operation of the first embodiment responsive to a region size change request.

FIG. 9 is a flow chart for explaining the operation of the document creating mechanism 41 responsive to a region size change request. When a region size change request which requests the region a size of the normalized region or the non-normalized region to be changed is made by the user after the handwritten data are input, the document creating mechanism 41 changes the region size of the region specified by the user in a step ST31. In addition, all of the data of the specified region developed in the work memory 42 are changed in a step ST32 depending on the changed region size, and the process ends.

Figure 10:
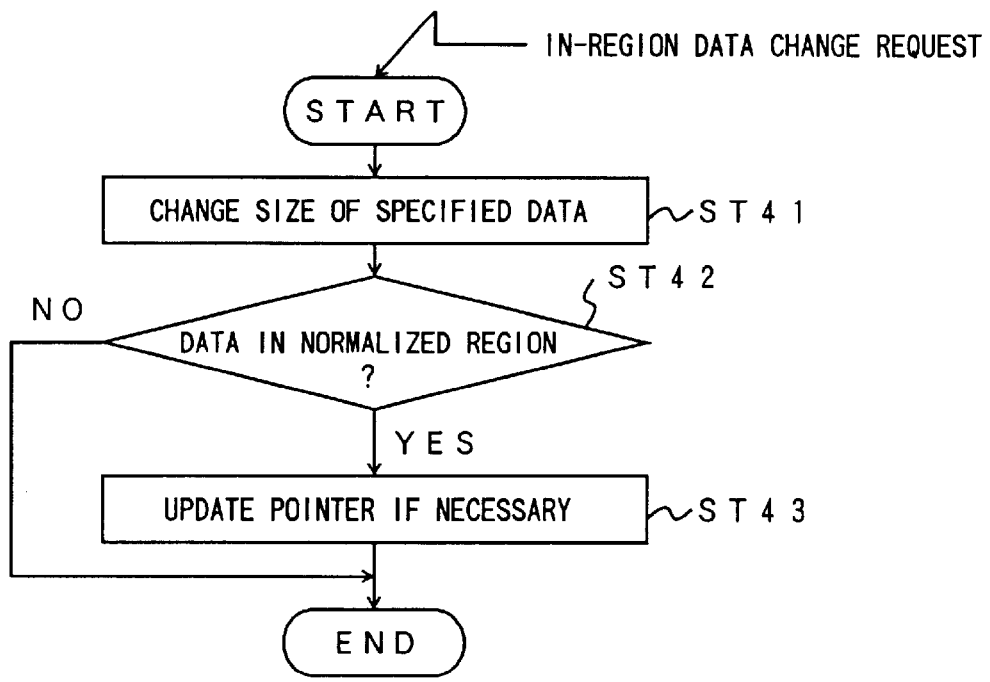
FIG. 10 is a flow chart for explaining thea operation of the first embodiment responsive to a in-region data change request.

FIG. 10 is a flow chart for explaining the operation of the document creating mechanism 41 responsive to an in-region data change request. When an in-region data change request which requests the in-region data within the normalized region or the non-normalized region to be changed is made by the user, the document creating mechanism 41 changes the in-region data to be developed in the work memory 42 into an in-region data specified by the user in a step ST41. A step ST42 decides whether or not the in region data belongs to the normalized region, and the process ends if the decision result in the step ST42 is NO. On the other hand, if the decision result in the step ST42 is YES, a step ST43 updates the pointer indicating the storage location of the handwritten data in response to an instruction from the user or the like if necessary, and the process ends.

Figure 14A:
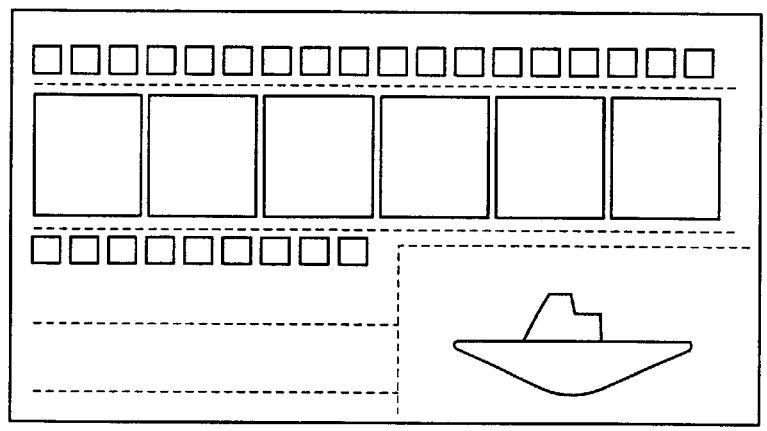
FIG. 14A and 14B respectively are diagrams for explaining another created document.
Figure 14B:
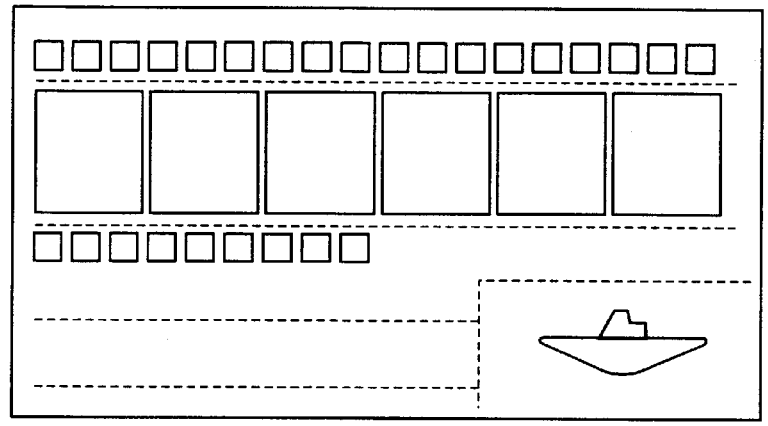

By providing these functions in the document creating mechanism 41, it becomes possible to create a document having an extremely free format. For example, it is possible to reduce only the graphics created in the non-normalized region shown in FIG. 14A into the reduced region as shown in FIG. 14B, thereby, making it possible to create a document having an extremely free format.

According to the first embodiment described above, the normalized region and the non-normalized region are set on the document creating screen, in order to solve the problem of the prior art, that is, the problem in that it was impossible to create a document having a free format in which the handwritten data which are converted into the normalized size and the handwritten data which are not converted into the normalized size coexist. However, the problem of the prior art can be solved by changing a portion or all portions of the normalized region into the non-normalized region in response to the region change request made by the user after the handwritten data are input. Similarly, the problem of the prior art can be solved by changing a portion or all portions of the non-normalized region into the normalized region.

In addition, according to the first embodiment described above, the plurality of normalized regions having different normalized sizes are set to coexist on the document creating screen, in order to solve the problem of the prior art, that is, the problem in that it was impossible to create the document having the free format in which the handwritten data converted into different normalized sizes coexist. However, the problem of the prior art is solved by cancelling the normalized size of the normalized region at a portion or all portions within the normalized region in response to the region change request made by the user after the handwritten data are input, and setting the normalized region having another normalized size in the cancelled region.

Particularly in the portable document creating apparatus such as the so-called handy electronic notebook type personal computer, it would be very convenient if it is possible to create a document having a format such that handwritten data and fair copy data coexist, and to enable simple reuse of the handwritten data in the created document.

In the document creating apparatus which creates a document in response to handwritten data generated from the handwritten data input device, two handwritten data input modes are provided, namely, the graphic input mode and the character input mode. As described above, according to the graphic input mode, the handwritten data are stored as they are in a memory and are displayed on a display screen. On the other hand, according to the character input mode, the handwritten data are converted into data having a prescribed normalized size and are stored in the memory while arranging the normalized data in a line, and the arranged data are displayed on the display screen.

In addition to such handwritten data input modes, the document creating apparatus is normally provided with a document create mode. In the document create mode, a document is created using character data and/or symbol data (hereinafter simply referred to as character symbol data) indicated by code data which are generated from a keyboard or, handwritten data are recognized and a document is created using character/symbol data indicated by code data which are obtained by the handwritten data recognition.

Conventionally, the document creating apparatus is designed to specify in advance the document create mode that is to be used to create the document. When creating the document in a document create mode using the handwritten data, the document is created using only the handwritten data and without the use of a document create mode using the fair copy data. On the other hand, when creating the document in the document create mode using the fair copy data, the document is created using only the character/symbol data, without the use of the document create mode using the handwritten data.

However, according to the conventional document creating apparatus, it is impossible to create a document having a format in which both the handwritten data and the fair copy data coexist.

Because it is impossible to create a document having a format in which both the handwritten data and the fair copy data coexist, there is virtually no possibility of reusing the handwritten data of the created document. As a result, no means is provided for enabling simple reuse of the handwritten data of the created document.

Next, a description will be given of third through sixth aspects of the present invention, which can create a document having a format such that handwritten data and fair copy data coexist, and can enable simple reuse of the handwritten data in the created document, by referring to FIGS. 15 through 18.

Figure 15:
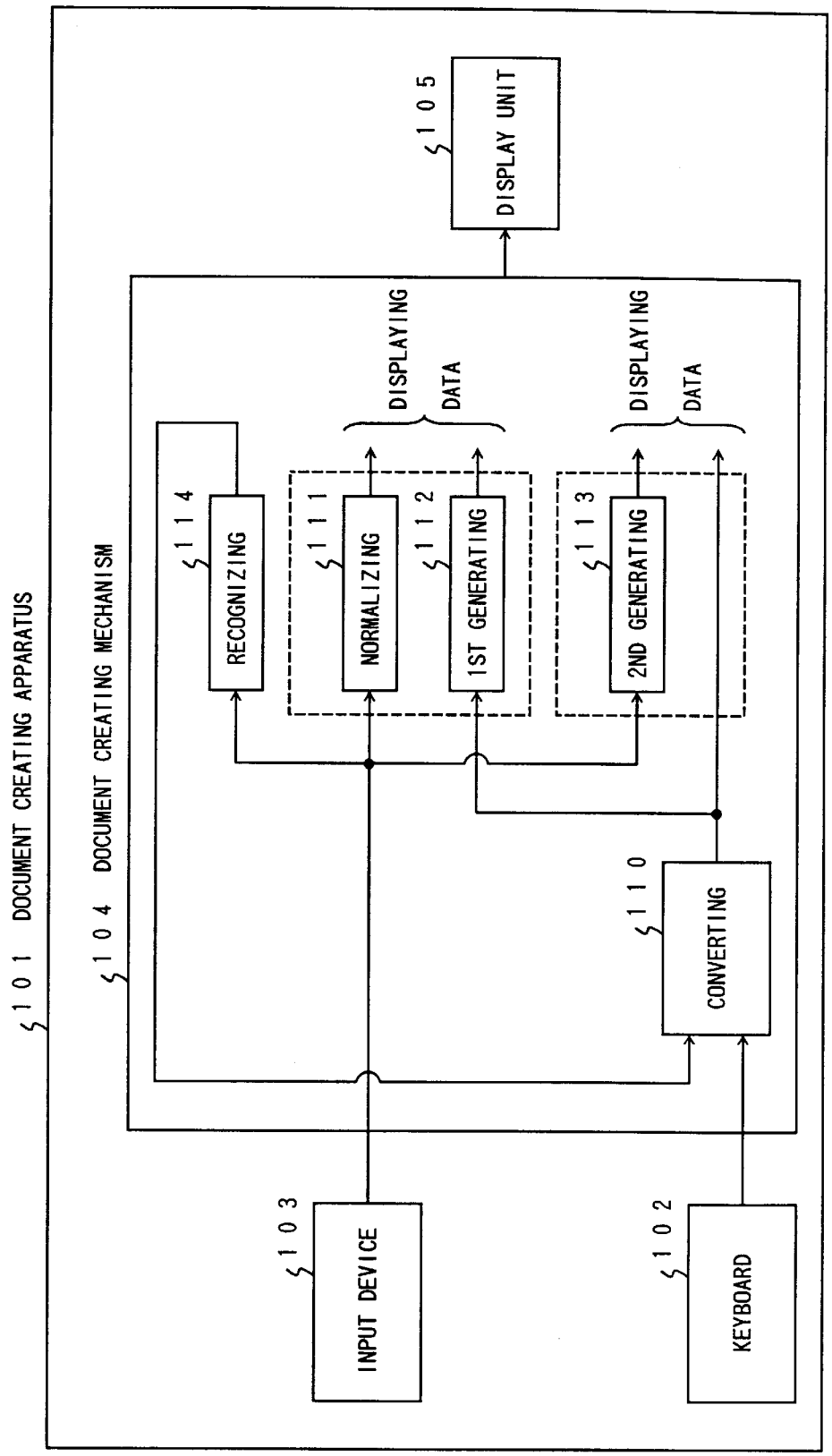
FIG. 15 is a system block diagram for explaining a third aspect of the present invention.

FIG. 15 is a system block diagram for explaining a third aspect of the present invention. A document creating apparatus 101 shown in FIG. 15 includes a keyboard 102 which generates code data, a handwritten data input device 103 which generates handwritten data, a document creating mechanism 104 which creates a document in response to the code data; generated from the keyboard 102 and/or the handwritten data generated from the handwritten data input device 103, and a display unit 105 which displays the document created by the document creating mechanism 104 on a display screen.

The document creating apparatus 101 can create a document having a format in which the handwritten data and the fair copy data coexist. In order to create the document having such a format, the document creating mechanism 104 is provided with a converting means 110, a normalizing means 111, a first generating means 112, a second generating means 113, and a recognizing means 114.

The converting means 110 converts the code data generated from the keyboard 102 into character/symbol data. The normalizing means 111 normalizes the size of the handwritten data generated from the handwritten data input device 103. The first generating means 112 changes the size of the character/symbol data output from the converting means 110. The second generating means 112 changes the size of the handwritten data generated from the handwritten data input device 103. The recognizing means 114 recognizes the handwritten data generated from the handwritten data input device 103, obtains code data indicated by the recognition result, and inputs the obtained code data to the converting means 110.

In the document creating apparatus 101 having the construction shown in FIG. 15, when the normalizing means ill normalizes the size of the handwritten data generated from the handwritten data input device 103 and generates displaying data for displaying the handwritten data, the first generating: means 112 changes the size of the character/symbol data output from the converting means 110 to the size of the handwritten data (displaying data) output from the normalizing means Ill so as to generate displaying data for displaying the character/symbol data.

Alternatively, the converting means 110 converts the code data generated from the keyboard 1032 into the character/symbol data, so as to generate the displaying data for displaying the character/symbol data. In this case, the second generating means 213 changes the size of the handwritten data generated from the handwritten data input device 103 to the size of the character/symbol data output from the converting means 210 so as to generate the displaying data for displaying the handwritten data.

According to the document creating apparatus 101 shown in FIG. 15, the handwritten data and the character/symbol data indicated by the code data are defined in the block of the same size, so that it is possible to create a document having a format in which the handwritten data and the fair copy data coexist.

Figure 16:
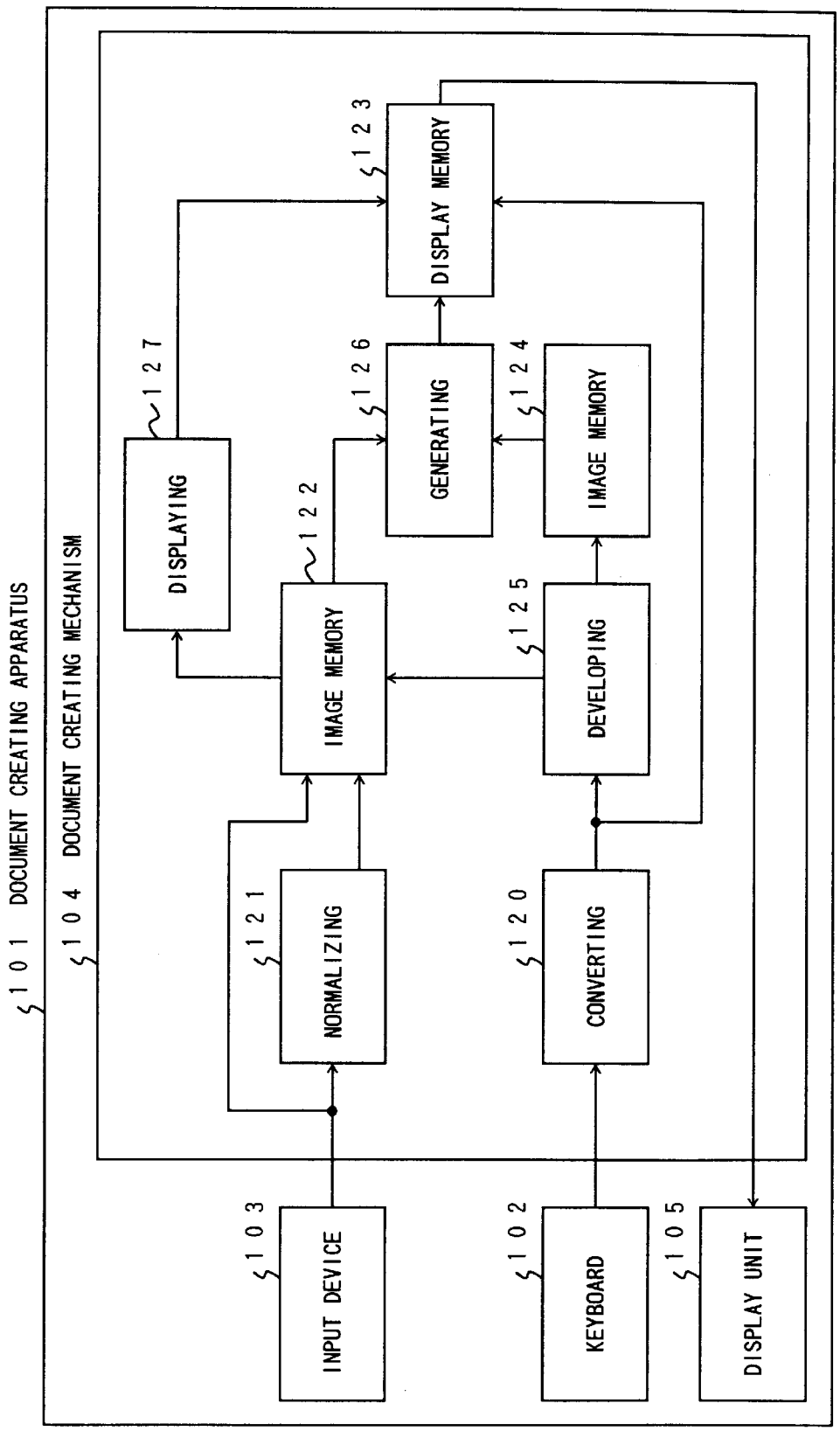
FIG. 16 is a system block diagram for explaining a fourth aspect of the present invention.

FIG. 16 is a system block diagram for explaining a fourth aspect of the present invention. In FIG. 16, those parts which are the same as those corresponding parts in FIG. 15 are designated by the same reference numerals, and a description thereof will be omitted. The document creating apparatus 101 shown in FIG. 16 is also designed to create a document having a format in which the handwritten data and the fair copy data coexist.

In the document creating apparatus 101 shown in FIG. 16, the document creating mechanism 104 includes a converting means 120, a normalizing means 121, an image memory means 122, a display memory means 123, an image memory means 124, a developing means 125, a generating means, and a displaying means 127.

The converting means 120 converts the code data generated from the keyboard 102 into the character/symbol data. The normalizing means 121 normalizes the size of the handwritten data generated from the handwritten data input device 103. The image memory means 122 stores the handwritten data generated from the handwritten data input device 103 and the normalized data output from the normalizing means 121. The display memory means 123 stores bit map data to be displayed on the display screen of the display unit 105.

The image memory means 124 is provided independently of the display memory means 123, and stores image data. The developing means 125 develops the character/symbol data output from the converting means 120 in the image memory means 122, and develops the character/symbol data output from the converting means 120 in the image memory means 124. The generating means 126 generates displaying data for displaying the created document from the data stored in the image memory means 124 and/or the image memory means 122, and stores the displaying data in the display memory means 123. The displaying means 127 generates the displaying data for displaying the created document from the data stored in the image memory means 122, and stores the displaying data in the display memory means 123.

In the document creating apparatus 101 having the construction shown in FIG. 16, the developing means 125 develops the character/symbol data output from the converting means 120 in the image memory means 122. In response to this development of the character/symbol data, the displaying means 127 generates the displaying data for displaying the created document from the character/symbol data and the handwritten data stored in the image memory means 122. The handwritten data and the character/symbol data coexist in the created document, and the displaying data for displaying the created document are stored in the display memory means 123.

Alternatively, the developing means 125 develops the character/symbol data output from the converting means 120 in the image memory means 124. In response to this development of the character/symbol data, the generating means 126 generates the displaying data for displaying the created document from the character symbol data stored in the image memory means 124 and the handwritten data stored in the image memory means 122. The handwritten data and the character/symbol data coexist in the created document, and the displaying data for displaying the created document are stored in the display memory means 123.

According to the document creating apparatus 101 shown in FIG. 16, the character/symbol data indicated by the code data are treated as image data similarly to the handwritten data. For this reason, it is possible to create the document having the format in which the handwritten data and the fair copy data coexist.

Figure 17:
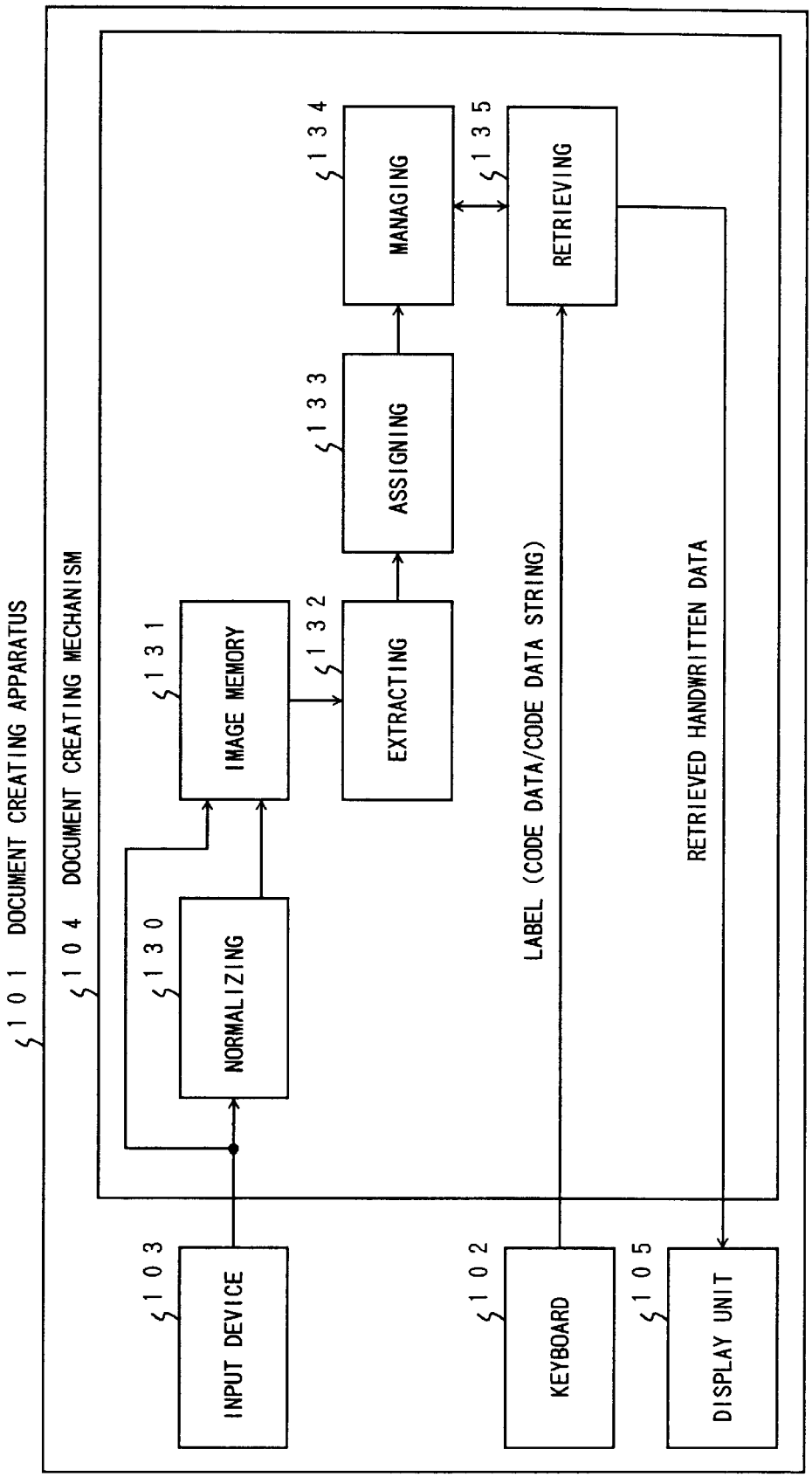
FIG. 17 is a system block diagram for explaining a fifth aspect of the present invention.

FIG. 17 is a system block diagram for explaining a fifth aspect of the present invention. In FIG. 17, those parts which are the same as those corresponding parts in FIG. 15 are designated by the same reference numerals, and a description thereof will be omitted. The document creating apparatus 101 shown in FIG. 17 is designed so that it is possible to simply reuse the handwritten data of the created document.

In the document creating apparatus 101 shown in FIG. 17, the document creating mechanism 104 is provided with a normalizing means 130, an image memory means 131, a extracting means 132, an assigning means 133, a managing means 134, and a retrieving means 135.

The normalizing means 130 normalizes the size of the handwritten data generated from the handwritten data input device 103. The image memory means 131 stores the handwritten data generated from the handwritten data input device 103 and the normalized data output from the normalizing means 130. The extracting means 132 extracts a handwritten data block made up of input units of one or a plurality of handwritten data, out of the handwritten data stored in the image memory means 131.

The assigning means 133 assigns a "reading" of "rendering" which becomes a label written by one or a plurality of code data, with respect to the handwritten data block extracted by the extracting means 132. The managing means 134 manages the corresponding relationship of the assignments made by the assigning means 133. The retrieving means 135 retrieves the handwritten data for which a retrieval request is made when the label is specified and the handwritten data retrieval request is made.

In the document creating apparatus 101 having the construction shown in FIG. 17, when the extracting means 132 extracts the handwritten data block from the handwritten data stored in the image memory means 131, the assigning means 133 assigns the "reading" which becomes the label written by one or a plurality of code data with respect to the extracted handwritten data block. In response to this assignment process, the managing means 134 manges the corresponding relationship of the assignment of the assigning means 133. When the label is specified and the handwritten data retrieval request is made, the retrieval means 135 retrieves the handwritten data for which the retrieval request is made by referring to management data of the managing means 134, and outputs the retrieved handwritten data on the display screen.

For example, when the user inputs a label "horse", it is possible to retrieve the handwritten data block which indicates the image of the horse that corresponds to the input label. For this reason, it is possible to simply reuse the handwritten data of the created document.

Figure 18:
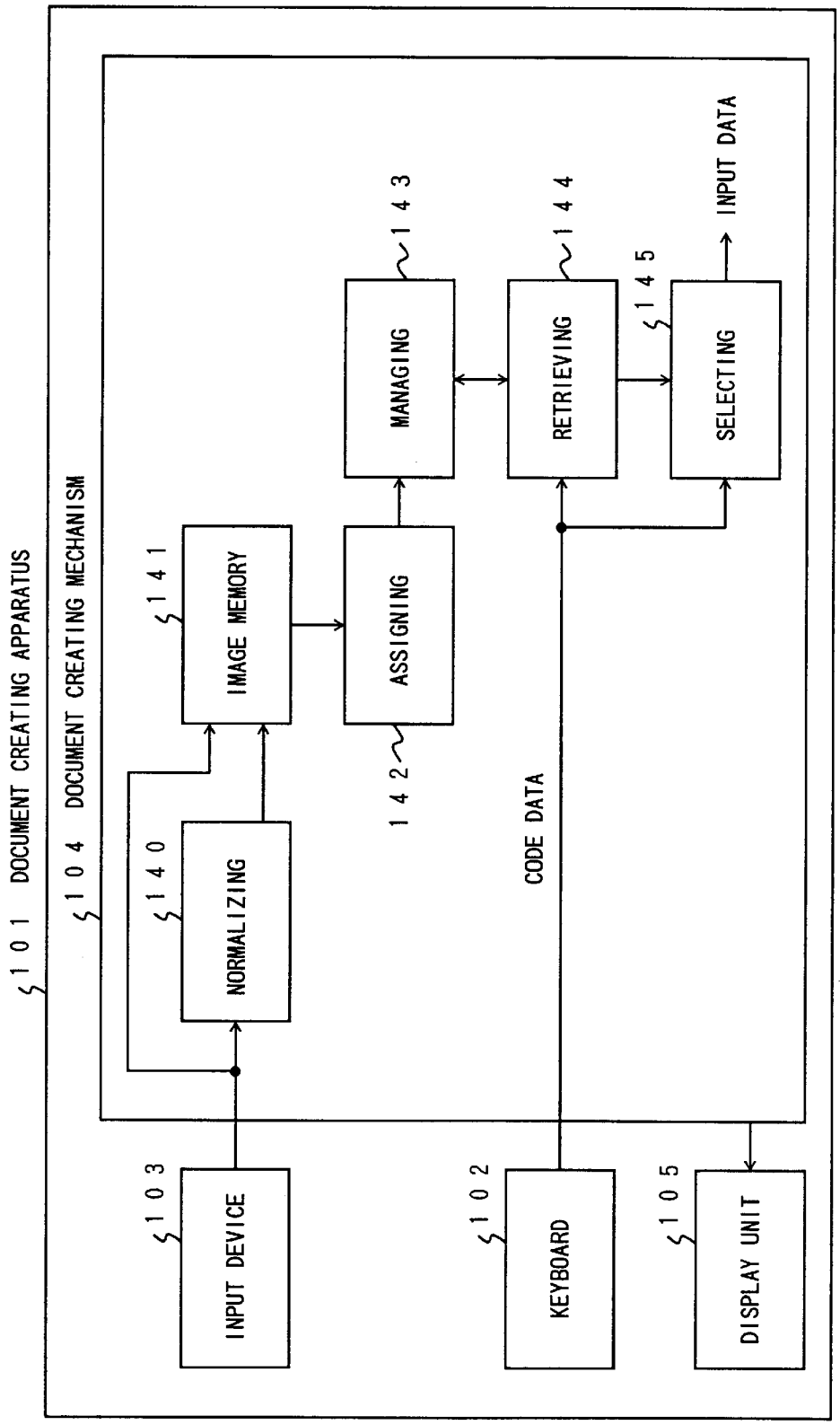
FIG. 18 is a system block diagram for explaining a sixth aspect of the present invention.

FIG. 18 is a system block diagram for explaining a sixth aspect of the present invention. In FIG. 18, those parts which are the same as those corresponding parts in FIG. 15 are designated by the same reference numerals, and a description thereof will be omitted. The document creating apparatus 101 shown in FIG. 18 is also designed so that it is possible to simply reuse the handwritten data of the created document.

In the document creating apparatus 101 shown in FIG. 18, the document creating mechanism 104 is provided with a normalizing means 140, an image memory means 141, an assigning means 142, a managing means 143, a retrieving means 144, and a selecting means 145.

The normalizing means 140 normalizes the size of the handwritten data generated from the handwritten data input device 103. The image memory means 141 stores the handwritten data generated from the handwritten data input device 103 and the normalized data output from the normalizing means 140. The assigning means 142 assigns code data of the character/symbol data with respect to the input unit of the handwritten data stored in the image memory means 141. In this case, the code data may be the code data of the character/symbol data corresponding to the handwritten data. The managing means 143 manges the corresponding relationship assigned by the assigning means 142.

The retrieving means 144 retrieves the handwritten data indicated by the code data when the code data is input. When the retrieving means 144 retrieves the handwritten data, the selecting means 145 selects the handwritten data as the input data in place of the character/symbol data indicated by the input code data.

In the document creating apparatus 101 having the construction shown in FIG. 18, when the assigning means 142 assigns the code data of the character/symbol data with respect to the input unit of the handwritten data stored in the image memory means 141, the managing means 143 manages the corresponding relationship assigned by the assigning means 142. In addition, when the code data is input, the retrieving means 144 makes a retrieval to determine whether or not the code data is registered in the managing means 143. If the code data is registered in the managing means 143, the retrieving means 144 retrieves the handwritten data corresponding to, that is, forming a pair with, the registered code data. In response to this retrieving process, the selecting means 145 selects the hand written data as the input data in place of the character/symbol data indicated by the input code data when the retrieving means 144 retrieves the handwritten data.

Therefore, according to the document creating apparatus 101 shown in FIG. 18, when the user inputs "a", for example, it is possible to input the handwritten data such as "a" and "A" which correspond to the code data of the input "a". For this reason, it is possible to simply reuse the handwritten data of the created document.

Figure 19:
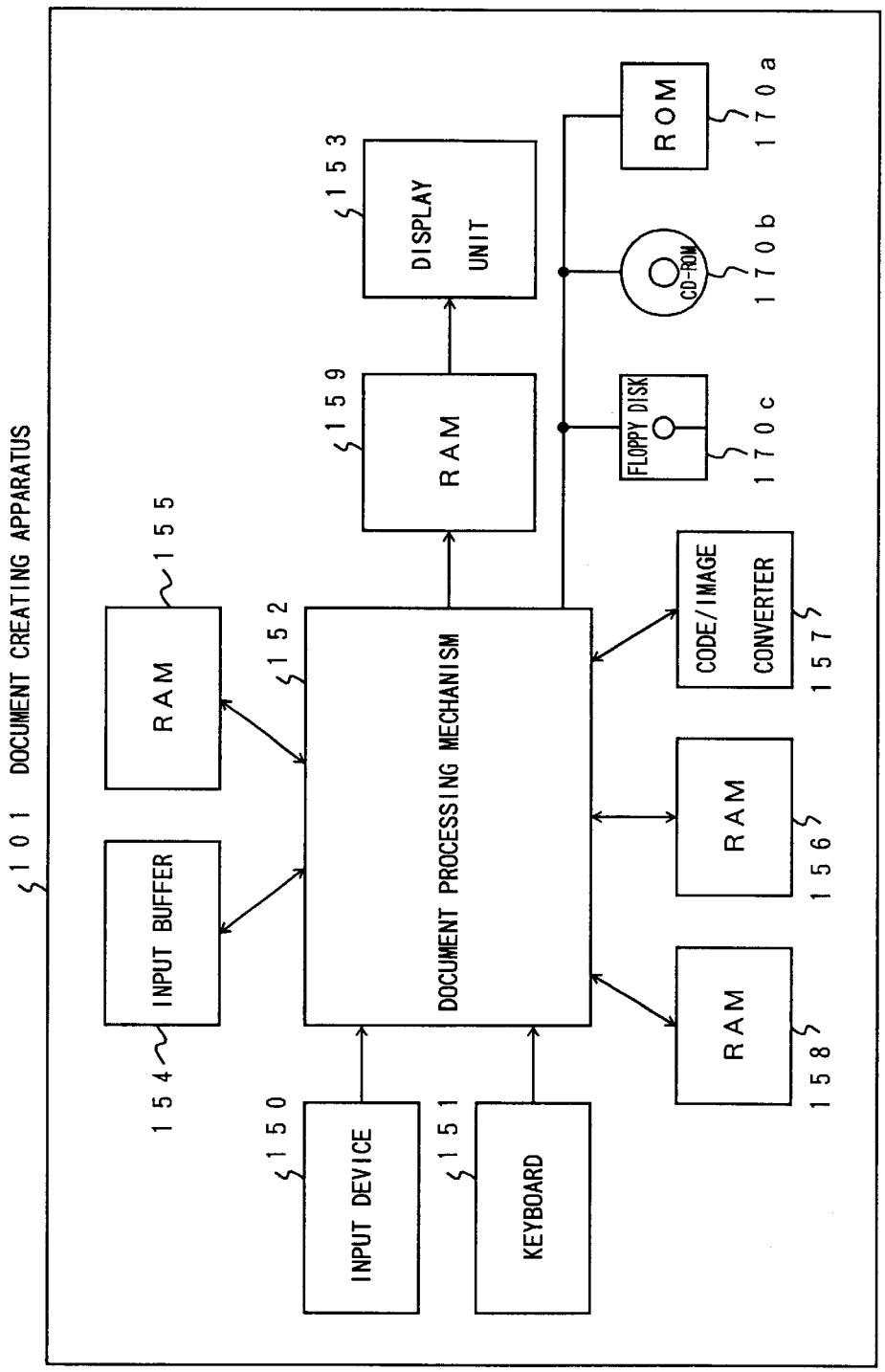
FIG. 19 is a system block diagram showing a second embodiment of the document creating apparatus according to the present invention.

Next, a description will be given of a second embodiment of the document creating apparatus according to the present invention. FIG. 19 is a system block diagram showing the second embodiment. This second embodiment employs the third aspect and/or the fourth aspect of the present invention described above.

The document creating apparatus 101 shown in FIG. 19 includes a handwritten data input device 150, a keyboard 151, a document processing mechanism 152, a display unit 153, an input buffer 154, an image storing RAM 155, a code storing RAM 156, a code/image converter 157, a character image storing RAM 158, a video RAM 159, and storage media 170a through 170c.

In this embodiment, the storage media 170a, 170b and 170c respectively are a ROM, a CD-ROM and a floppy disk, but the type of storage medium is of course not limited to such. The document processing mechanism 152 includes an internal memory and a central processing unit (CPU) which carries out various functions based on programs which are read from at least one of the storage media 170a through 170c and stored in the internal memory. The illustration of a CD-ROM drive which plays the CD-ROM 170b and a floppy disk drive which plays the floppy disk 170c is omitted in FIG. 19 because such drives are well known.

The present invention includes a computer program product which is a storage medium, such as the storage media 170a through 170c, including instructions which can be used to program a computer to perform a process of the invention, that is, the process of the document creating apparatus 101. The storage medium can include, but is not limited to, any type of disk including hard disks, floppy disks, optical disks, CD-ROMs, and magneto-optical disks, ROMs, RAMS, EPROMs, EEPROMS, SRAMS, flash memories, magnetic or optical cards, or any type of media suitable for storing electronic instructions.

The handwritten data input device 150 generates handwritten characters, symbols and graphics (hereinafter simply referred to as handwritten data) in accordance with the input unit. The keyboard 151 generates the code data of the characters and codes, and issues commands for creating the document, editing, the document and the like. The document processing mechanism 152 receives the handwritten data generated from the handwritten data input device 150 and the code data and commands generated from the keyboard 151, and creates a document based thereon. The display unit 153 displays the document which is created by the document processing mechanism 152 on a display screen of the display unit 153.

The input buffer 154 temporarily stores the input unit of the handwritten data generated from the handwritten data input device 150. The image storing RAM 155 stores the handwritten data generated from the handwritten data input device 150 and the handwritten data having the normalized size. The code storing RAM 156 store the code data generated from the keyboard 151. The code/image converter 157 calculates the image of the characters and/or symbols indicated by the input code data. The character image storing RAM 158 stores the image data of the characters and/or symbols generated from the code/image converter 157. The video RAM 159 stores the image data of the document which is displayed on the display unit 153.

Figure 20:
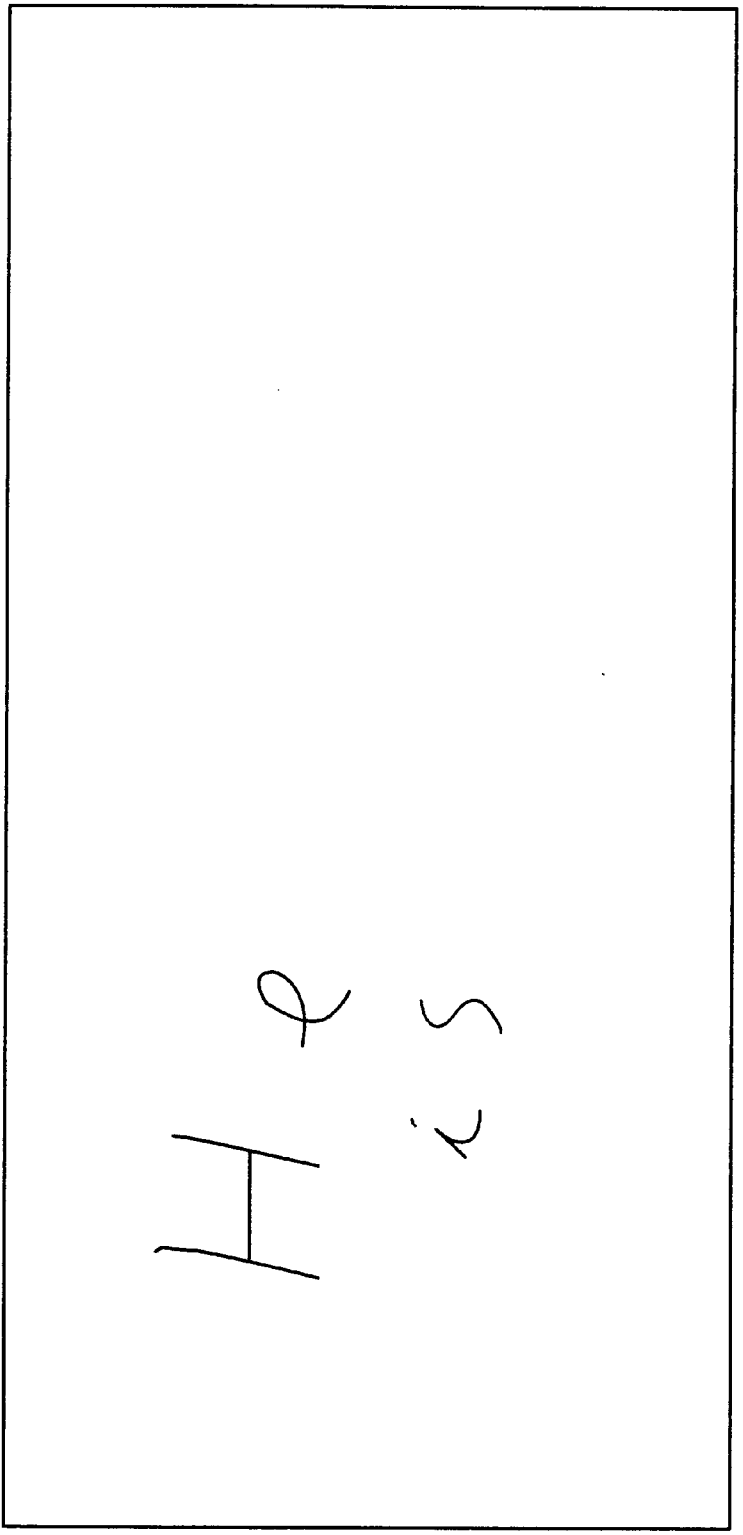
FIG. 20 is a diagram for explaining a non-normalized region.
Figure 21:
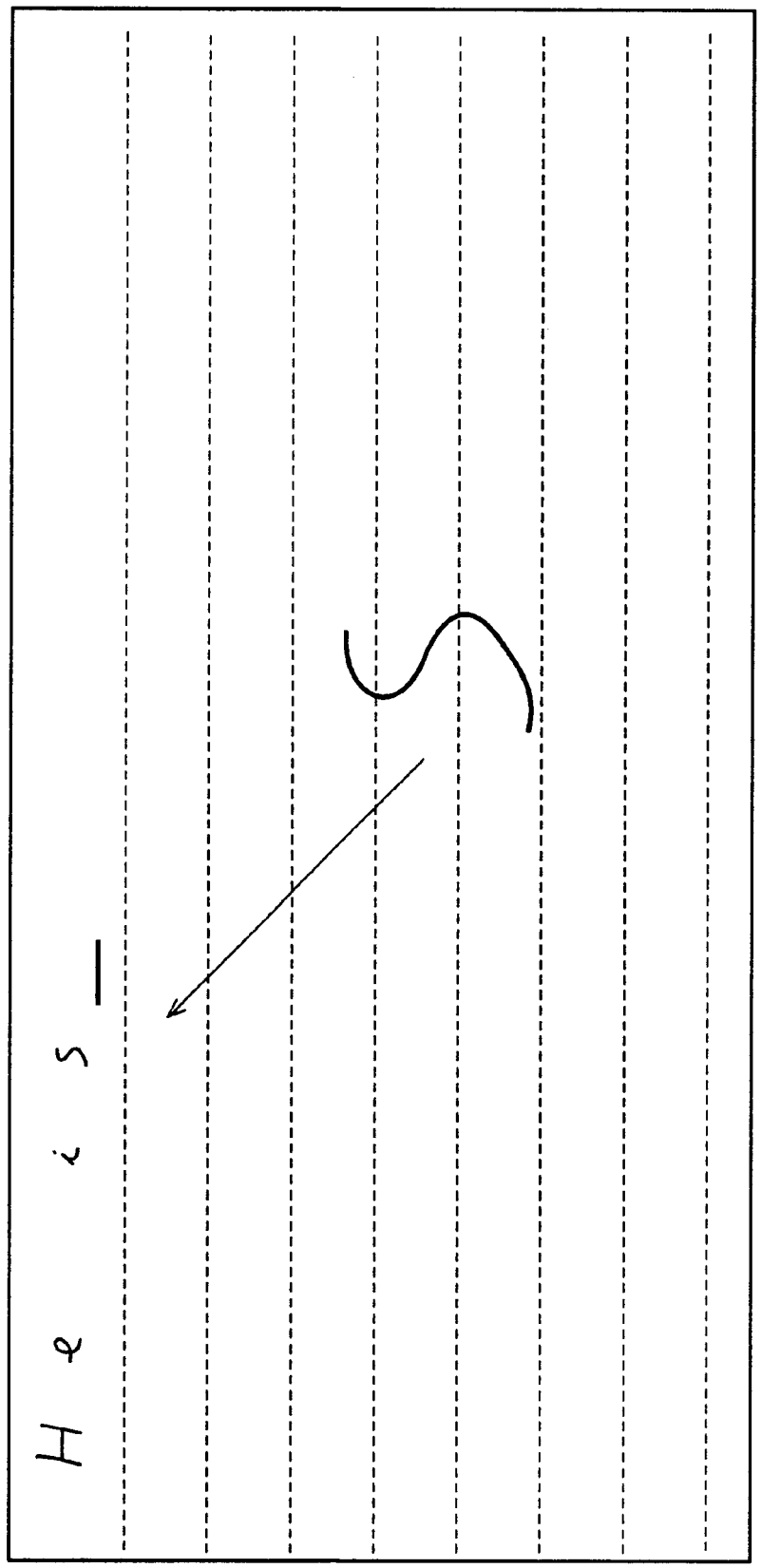
FIG. 21 is a diagram for explaining a normalized region.

The document processing mechanism 152 stores the handwritten data such as that shown in FIG. 20 which are generated from the handwritten data input device 150, as they are, in the image storing RAM 155. The document processing mechanism 152 also stores in the image storing RAM 155 the handwritten data such as that shown in FIG. 21 while normalizing the input unit of the handwritten data to a prescribed size.

The document processing mechanism 152 can carry out the document creating process using one of two kinds of input modes which are a code input mode and a handwriting input mode. When carrying out the document creating process using the code input mode, the document processing mechanism 152 creates the document in response to the code data generated from the keyboard 151 or, creates the document by recognizing the handwritten data generated from the handwritten data input device 150 and obtaining the code data indicated by the recognized handwritten data. On the other hand, when carrying out the document creating process using the handwriting input mode, the document processing mechanism 152 creates the document in response to the handwritten data generated from the handwritten data input device 150. The input mode can be set by the user from the keyboard 151, for example.

Hence, when creating the document in this embodiment, the input unit of the handwritten data and the input unit of the fair copy data of the characters and/or symbols are defined in the block of the same size, so that it is possible to create the document having the format in which the handwritten data and the fair copy data of the characters and/or symbols coexist. The fair copy data are the image data specified by the code data. Alternatively, the fair copy data of the characters and/or symbols are treated as image data, similarly to the handwritten data.

Next, a description will be given of the operation of the document processing mechanism 152 of this embodiment, by referring to FIGS. 22 through 25. FIGS. 22 through 25 are flow charts for explaining the operation of the document processing mechanism 152 shown in FIG. 19.

Figure 22:
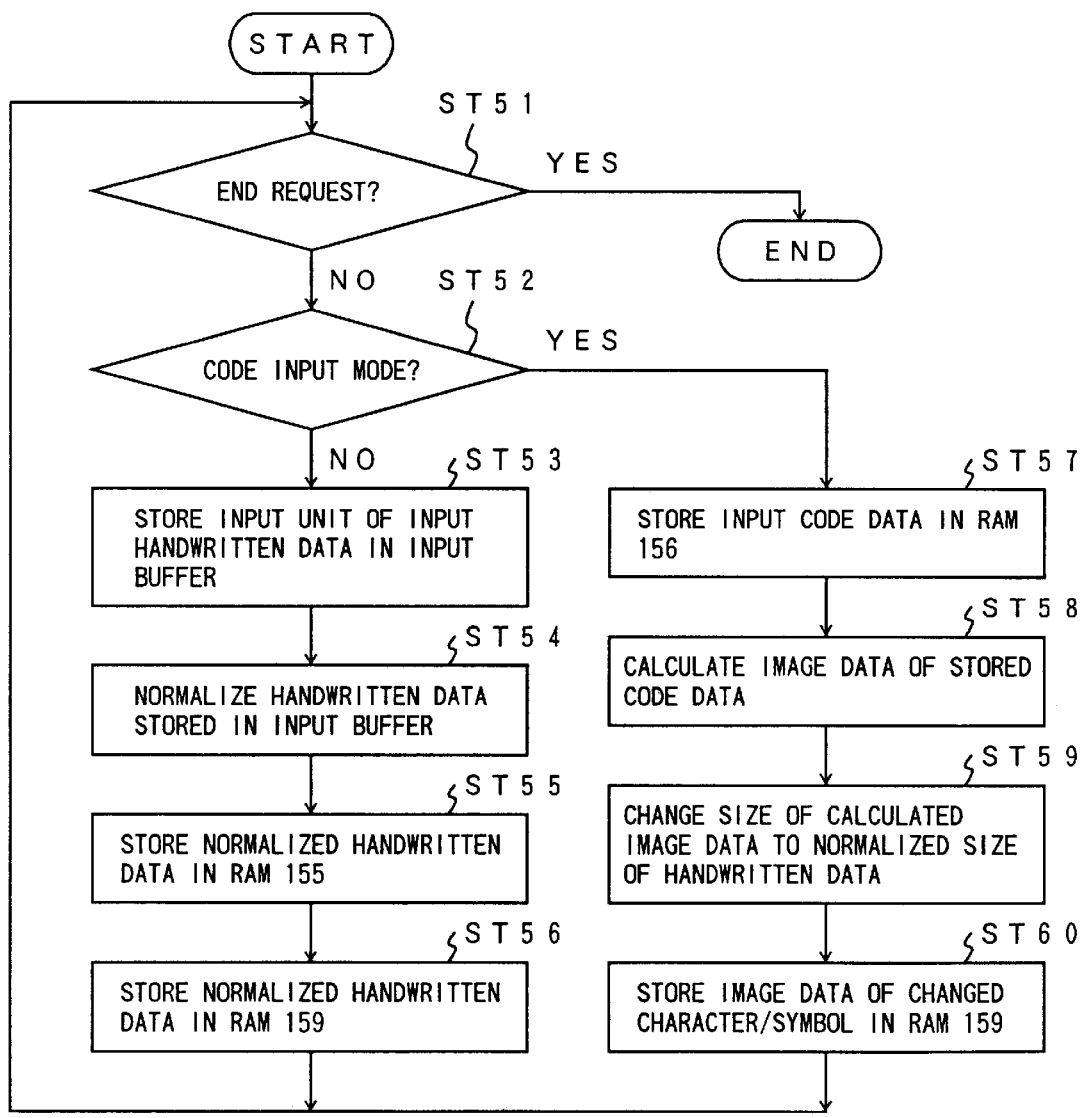
FIG. 22 is a flow chart for explaining the operation of a document processing mechanism of the second embodiment.

FIG. 22 is a flow chart for explaining one operation of the document processing mechanism 152 of this embodiment. In FIG. 22, the document processing mechanism 152 decides whether or not a document create request is issued in a step ST51, and the process ends if the decision result in the step ST51 is YES. On the other hand, if the decision result in the step ST51 is NO, a step ST52 decides whether or not the input mode is set to the code input mode. In other words, the decision result in the step ST52 is YES when the input mode is the code input mode, and is NO when the input mode is the handwriting input mode.

If the decision result in the step ST52 is NO, a step ST53 stores the input unit of the handwritten data input from the handwritten data input device 150 in the input buffer 154, and a step ST54 normalizes the size of the handwritten data stored in the input buffer 154 to a prescribed size.

A step ST55 stores the normalized handwritten data in a storage region of the image storing RAM 155 pointed by the cursor which is displayed on the display screen of the display unit 153 to indicate the data input destination. Then, a step ST56 stores the normalized handwritten data in a storage region of the video RAM 159 pointed by the cursor, so as to display the normalized handwritten data on the display unit 153, and the process returns to the step ST51 so as to accept the next data input.

On the other hand, if the decision result in the step ST52 is YES, a step ST57 stores the code data of the characters and/or symbols input from the keyboard 151 in the code storing RAM 156. The code data stored in the code storing RAM 156 may be the code data obtained by recognizing the handwritten data. A step ST58 calculates the image data indicated by the code data stored in the code storing RAM 156 using the code/image converter 157.

Thereafter, a step ST59 changes the size of the calculated image data to the normalized size of the handwritten data. Further, a step ST60 stores the image data of the characters and/or symbols with the changed size in the storage region of the video RAM 159 pointed by the cursor, so as to display the image data on the display unit 153, and the process returns to the step ST51 so as to accept the next data input.

Figure 26:
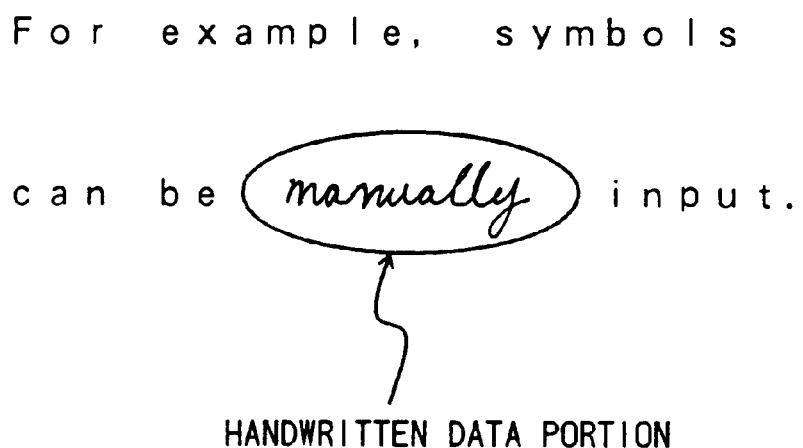
FIG. 26 is a diagram for explaining a created document.

By carrying out the process shown in FIG. 22, the document processing mechanism 152 matches the size of the image data of the characters and/or symbols indicated by the code data input from the keyboard 151 to the size of the handwritten data to be normalized, so that the input unit of the handwritten data and the input unit of the fair copy data of the characters and/or symbols are defined within the block of the same size. As a result, it is possible to create a document having a format shown in FIG. 26 in which the handwritten data and the fair copy data of the characters and/or symbols coexist.

Figure 23:
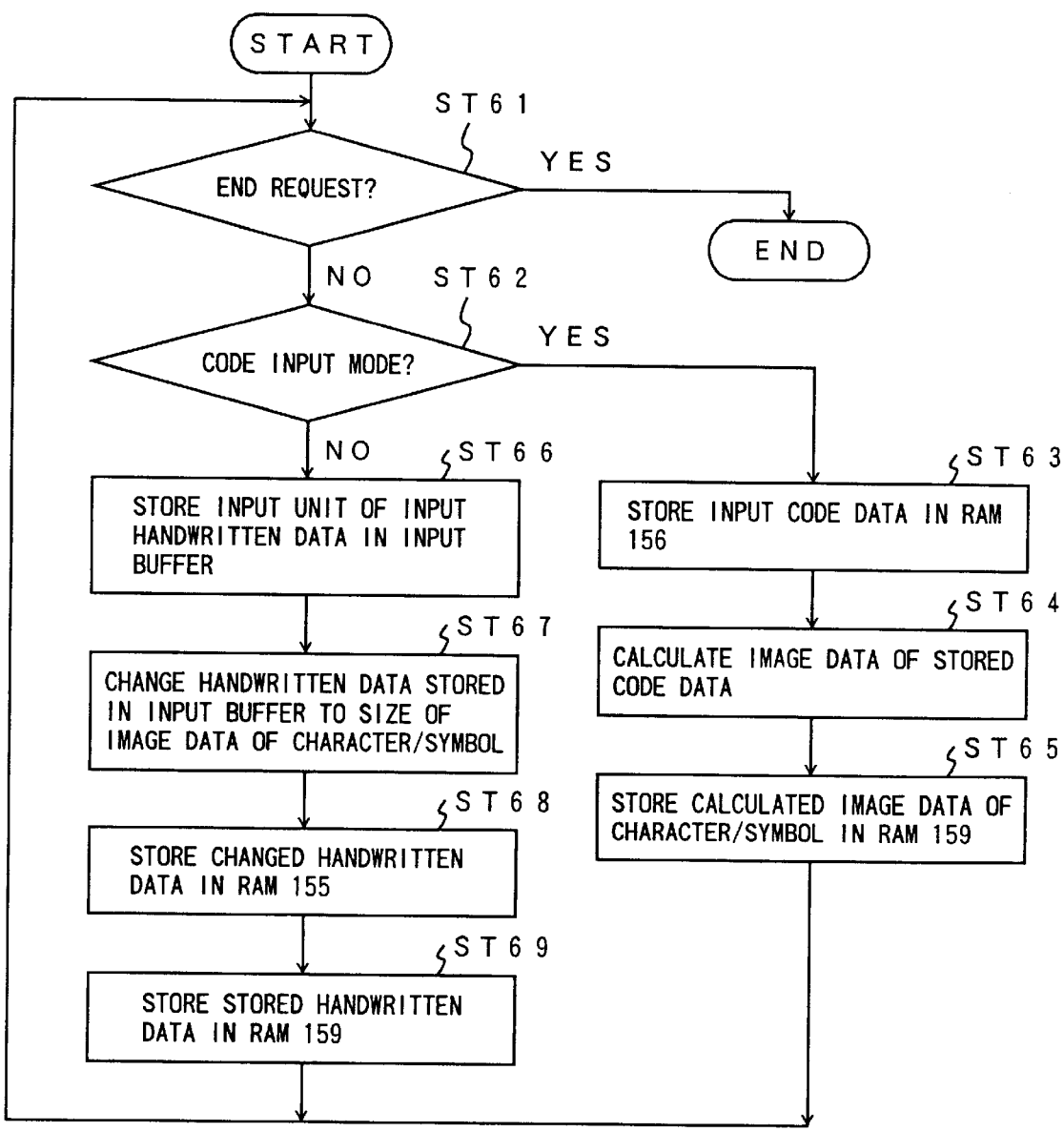
FIG. 23 is a flow chart for explaining the operation of the document processing mechanism of the second embodiment.

FIG. 23 is a flow chart for explaining another operation of the document processing mechanism 152. In FIG. 23, the document processing mechanism 152 decides whether or not the document create end request is issued in a step ST61, and the process ends if the decision result in the step ST61 is YES on the other hand, if the decision result in the step ST61 is NO, a step ST62 decides whether or not the input mode is set to the code input mode. In other words, the decision result in the step ST62 is YES when the input mode is the code input mode, and is No when the input mode is the handwriting input mode.

If the decision result in the step ST62 is YES, a step ST63 stores the code data of the characters and/or symbols input from the keyboard 151 in the code storing RAM 156. The code data stored in the code storing RAM 156 may be the code data obtained by recognizing the handwritten data. A step ST64 calculates the image data indicated by the code data stored in the code storing RAM 156 using the code/image converter 157. A step ST65 stores the calculated image data of the characters and/or symbols in the storage region of the video RAM 159 pointed by the cursor, so as to display the image data on the display unit 153, and the process returns to the step ST61 so as to accept the next data input.

On the other hand, if the decision result in the step ST62 is NO, a step ST68 stores the input unit of the handwritten data input from the handwritten data input device 150 in the input buffer 154, and a step ST67 normalizes the size of the handwritten data stored in the input buffer 154 to the size of the image data of the characters and/or symbols.

A step ST68 stores the normalized handwritten data in a storage region of the image storing RAM 155 pointed by the cursor which is displayed on the display screen of the display unit 153 to indicate the data input destination. Then, a step ST69 stores the normalized handwritten data in a storage region of the video RAM 159 pointed by the cursor, so as to display the normalized handwritten data on the display unit 153, and the process returns to the step ST61 so as to accept the next data input.

By carrying out the process shown in FIG. 23, the document processing mechanism 152 matches the size of the handwritten data input from the handwritten data input device 150 to the size of the image data of the characters and/or symbols indicated by the code data input from the keyboard 151, so that the input unit of the handwritten data and the input unit of the fair copy data of the characters and/or symbols are defined within the block of the same size. As a result, it is possible to create a document having a format shown in FIG. 26 in which the handwritten data and the fair copy data of the characters and/or symbols coexist.

Figure 24A:
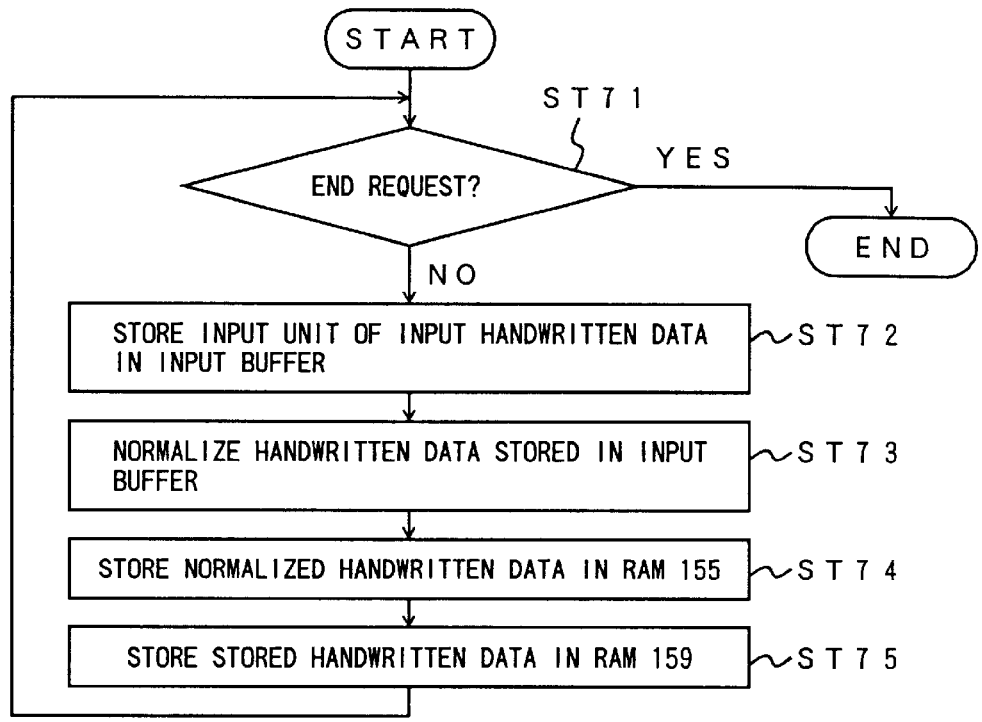
FIGS. 24A and 24B respectively are flow charts for explaining the operation of the document processing mechanism of the second embodiment.

FIG. 24A is a flow chart for explaining another operation of the document processing mechanism 152 when creating a document in accordance with the handwriting input mode. In FIG. 24A, the document processing mechanism 152 decides whether or not the document create end request is issued in a step ST71, and the process ends if the decision result in the step ST71 is YES. On the other hand, if the decision result in the step ST71 is NO, a step ST72 stores the input unit of the handwritten data input from the handwritten data input device 150 in the input buffer 154.

A step ST73 normalizes the size of the handwritten data store din the input buffer 154 to a prescribed size. A step ST74 stores the normalized handwritten data in a storage region of the image storing RAM 155 pointed by the cursor. A step ST75 stores the normalized handwritten data in a storage region of the video RAM 159 pointed by the cursor and displays the normalized handwritten data on the display unit 153, and the process returns to the step ST71 so as to accept the next data input.

Instead of storing the normalized handwritten data in the image storing RAM 155, it is also possible to store the handwritten data as they are in the image storing RAM 155.

Figure 24B:
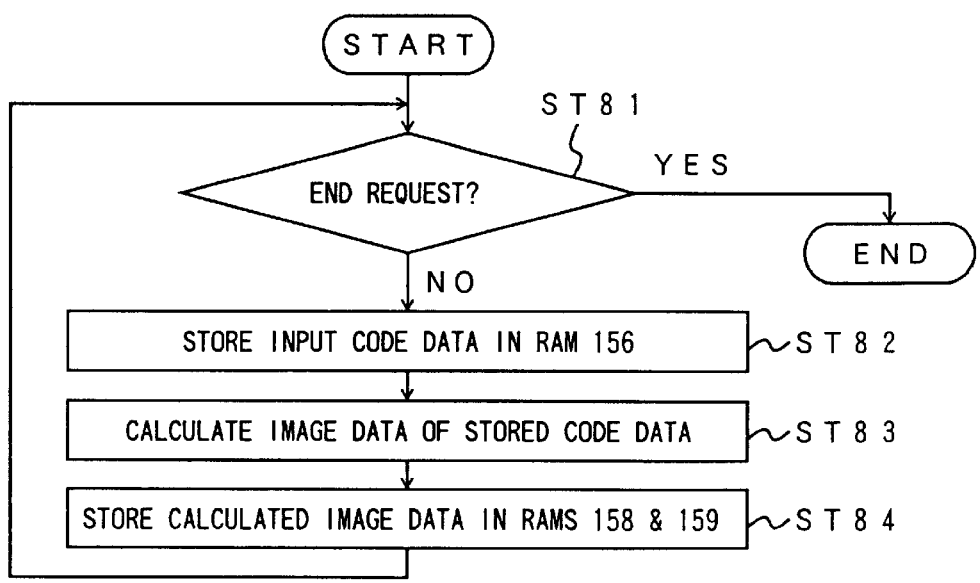

FIG. 24B is a flow chart for explaining another operation of the document processing mechanism 152 when creating a document in accordance with the code input mode. In FIG. 24B, the document processing mechanism 152 decides whether or not the document create end request is issued in a step STS1, and the process ends if the decision result in the step STS1 is YES. On the other hand, if the decision result in the step STSI is NO, a step ST82 stores the code data of the characters and/or symbols input from the keyboard 151 in the code storing RAM 156.

A step ST83 calculates the image data indicated by the code data store din the code storing RAM 156 using the code/image converter 157. A step ST84 stores the calculated image data of the characters and/or symbols in a storage region of the character image storing RAM 158 pointed by the cursor, stores the image data in a storage region of the video RAM 159 pointed by the cursor to display the image data on the display unit 153, and the process returns to the step STS1 so as to accept the next data input.

In a state where the handwritten data are stored in the image storing RAM 155 and the image data of the characters and/or symbols are stored in the character image storing RAM 158, the document processing mechanism 152 carries out the operation shown in FIG. 25 when a display request to display the handwritten data and a display request to display the fair copy data of the characters and/or symbols are made simultaneously.

In FIG. 25, the document processing mechanism 152 specifies the handwritten data that are requested to be displayed simultaneously as the fair copy data in a step ST91 through an interactive operation with the user. A step ST92 specifies a storage region of the image storing RAM 155 where the specified handwritten data are to be stored. A step ST93 reads the handwritten data from the specified region of the image storing RAM 155 and stores the read handwritten data in a storage region of the video RAM 159 indicated by a destination of the display request, so as to display the handwritten data on the display unit 153.

A step ST94 specifies the character/symbol data that are requested to be displayed simultaneously as the handwritten data through an interactive operation with the user. A step ST95 specifies a storage region of the character image storing RAM 158 where the specified character/symbol data are to be stored. Then, a step ST96 reads the character/symbol data (that is, the image data of the characters and/or symbols) from the specified storage region of the character image storing RAM 158 and stores the character/symbol data in a storage region of the video RAM 159 indicated by a destination of the display request, so as to display the character/symbol data on the display unit 153.

Therefore, by carrying out the operations shown in FIGS. 24A, 24B and 25 , the document processing mechanism 152 can treat the character/symbol data indicated by the code data input from the keyboard 151 as image data, similarly to the handwritten data input from the handwritten data input device 150. As a result, it is possible to create a document having a format shown in FIG. 26 in which the handwritten data and the fair copy data of the characters and/or symbols coexist.

In this embodiment, the image storing RAM 155 and the character image storing RAM 158 are provided independently of each other. However, it is of course possible to provide a storage region which functions as the character image storing RAM 158 within the image storing RAM 155.

Figure 27:
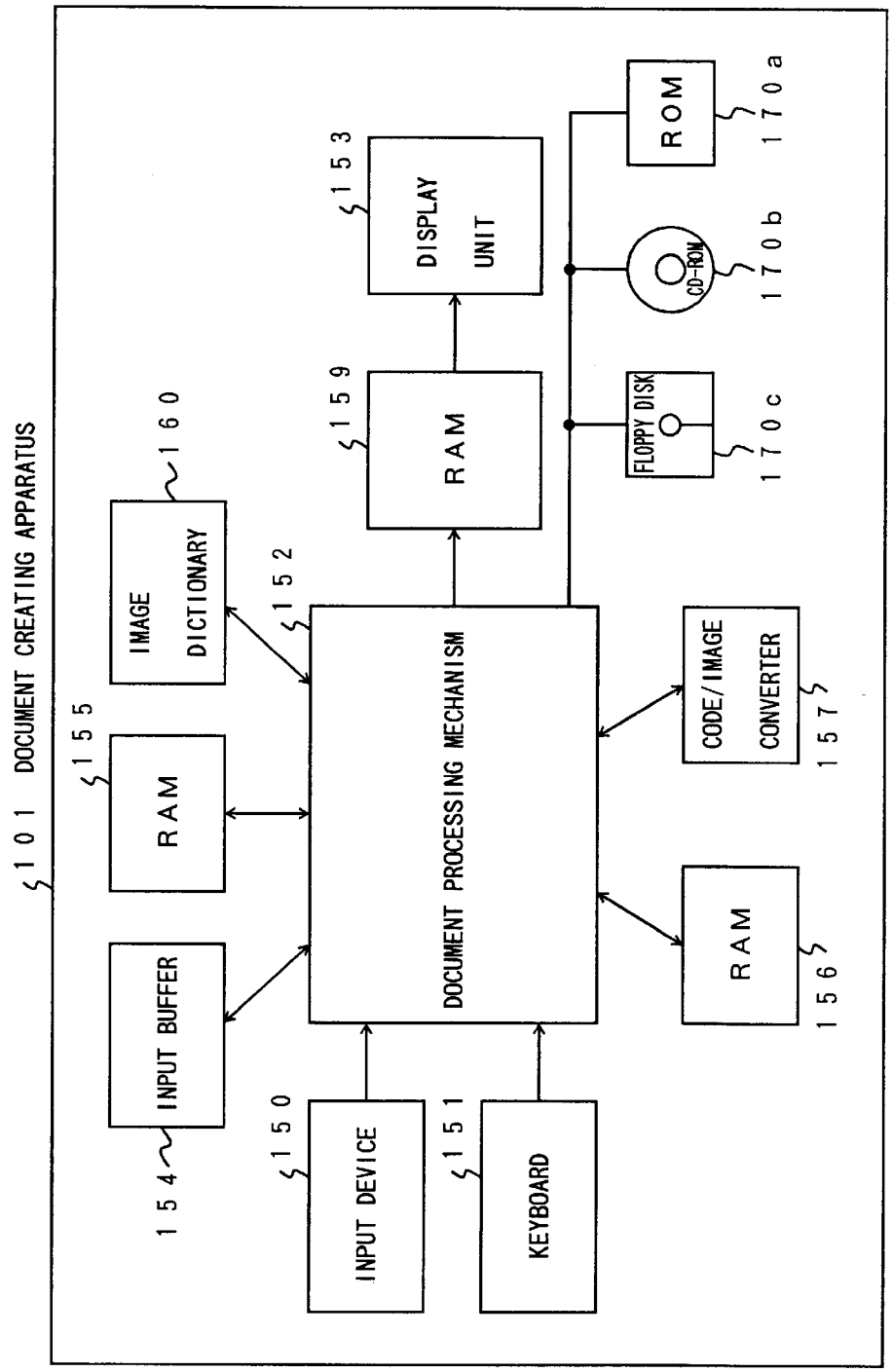
FIG. 27 is a system block diagram showing a third embodiment of the document creating apparatus according to the present invention.

Next, a description will be given of a third embodiment of the document creating apparatus according to the present invention. FIG. 27 is a system block diagram showing the third embodiment. This second embodiment employs the fifth aspect and/or the sixth aspect of the present invention described above. In FIG. 27, those parts which are the same as those corresponding parts in FIG. 19 are designated by the same reference numerals, and a description thereof will be omitted.

The document creating apparatus 101 shown in FIG. 27 includes an image dictionary 160. This image dictionary 160 manages corresponding relationships of pointers which point storage regions of the image storing RAM 155 and "readings" which are assigned to the handwritten data pointed by the pointers. The "reading" or "rendering" refers to how one character or symbol or, a combination of a plurality of characters and/or symbols is read or pronounced.

With respect to one block of the handwritten data stored in the image storing RAM 155, the document: creating apparatus 101 assigns a "reading" which becomes a label for the handwritten data block. The handwritten data block may consist of one handwritten data. The corresponding relationship of the handwritten data block and the corresponding label is managed by the image dictionary 160. When the "reading" of the handwritten data block is input from the keyboard 151, the document creating apparatus 101 retrieves the corresponding handwritten data block from the image dictionary 160 by searching the handwritten data blocks within the image dictionary 160. thereby making it possible to simply reuse the handwritten data of the created document.

Next, a description will be given of the operation of the document processing mechanism 152 of this embodiment, by referring to FIGS. 28 through 31. FIGS. 28 through 31 are flow charts for explaining the operation of the document processing mechanism 152 shown in FIG. 27.

Figure 28:
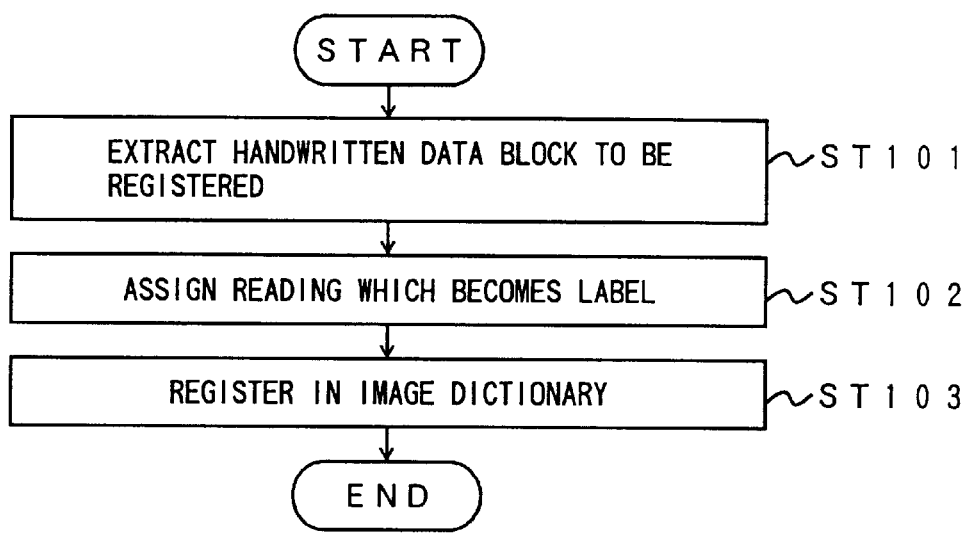
FIG. 28 is a flow chart for explaining the operation of a document processing mechanism of the third embodiment.
Figure 29:
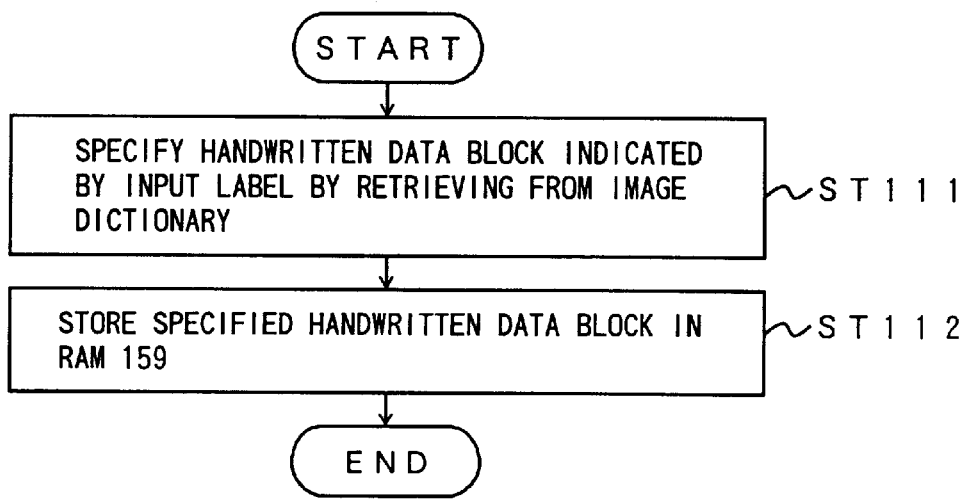
FIG. 29 is a flow chart for explaining the operation of the document processing mechanism of the third embodiment.

In FIG. 28, when a register request for making a registration in the image dictionary 160 is made by the user, the document processing mechanism 152 extracts the handwritten data block which is the subject of the registration to the image dictionary 160, out of the handwritten data stored in the image storing RAN 155, through an interactive operation with the user, in a step ST101. For example, the handwritten data block describing a picture of scenery which includes a mountain is extracted from the handwritten data stored in the image storing RAM 155. The handwritten data block may be extracted by the input unit of one handwritten data.

A step ST102 assigns the code data (that is, the code data string) of the "reading" which becomes the label with respect to the extracted handwritten data block, through interactive operation with the user. For example, a label "m" or "mountain" is assigned with respect to the extracted handwritten data block describing the picture of the scenery which includes the mountain. Then, a step ST103 registers the corresponding relationship of the pointer to the extracted handwritten data block and the "reading" assigned to the extracted handwritten data block in the image dictionary 160.

Accordingly, by carrying out the operation shown in FIG. 28, the corresponding relationships of the pointers to the handwritten data blocks stored in the image storing RAN 155 and the "readings" α1 through an assigned to the handwritten data blocks are registered in the image dictionary 160 as shown in FIG. 32. In FIG. 32, each rectangular boxes shown on the right hand side indicates one handwritten data block.

Figure 31:
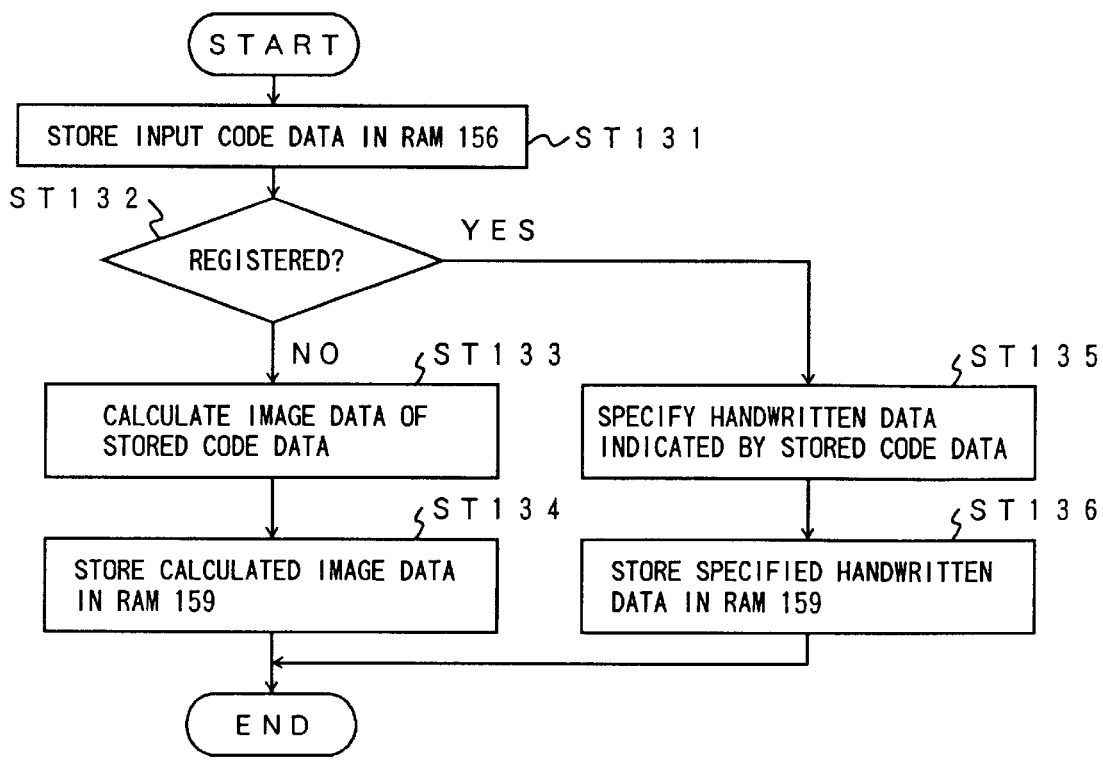
FIG. 31 is a flow chart for explaining the operation of the document processing mechanism of the third embodiment.

In addition, in FIG. 31, when the user specifies the "reading", that is, the input label, of the handwritten data block and a retrieval request is made to retrieve the handwritten data block, the document processing mechanism 152 searches the handwritten data blocks within the image dictionary 160 in a step ST111, and specifies the handwritten data block indicated by the "reading" by specifying the pointer which points this "reading". Then, a step ST112 stores the specified handwritten data block in the video RAM 159 so as to display the handwritten data block on the display unit 153.

Accordingly, when the user specifies the label "n" or "mountain", for example, and issues the retrieval request which requests retrieval of the handwritten data block, the handwritten data block describing the picture of the scenery which includes the mountain corresponding to the specified label is displayed on the display screen of the display unit 153. As a result, it is possible to simply reuse the handwritten data of the created document.

In this embodiment, the "reading" is assigned with respect to the handwritten data block. However, the handwritten data block may include in a portion thereof the fair copy data of the characters and/or symbols.

In the above case, the handwritten data are reused by issuing the retrieval request which request retrieval of the handwritten data. However, it is also possible to reuse the handwritten data by automatically using the handwritten data as the input data in place of the fair copy data indicated by the input code data when the user inputs the code data, as described below in conjunction with FIGS. 30 and 31.

Figure 30:
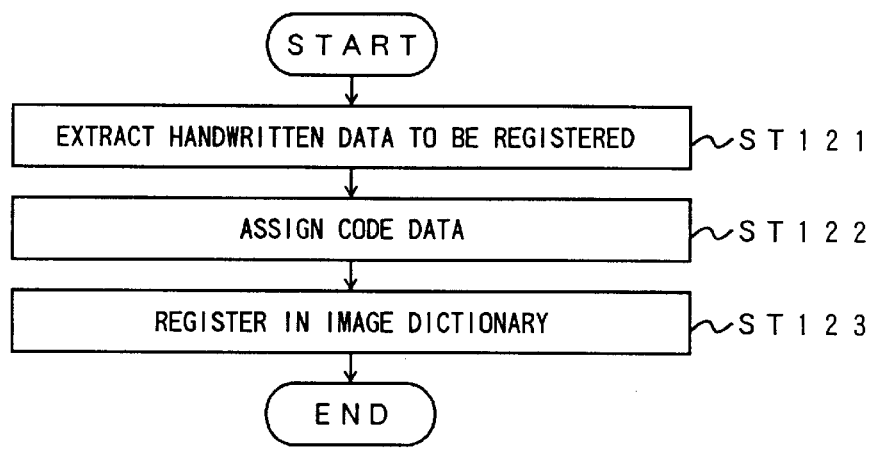
FIG. 30 is a flow chart for explaining the operation of the document processing mechanism of the third embodiment.

In FIG. 30, when a register request which requests registration to the image dictionary 160 is made by the user, the document processing mechanism 152 extracts the input unit of the handwritten data which are the subject of the registration to the image dictionary 160, out of the handwritten data stored in the image storing RAM 155, through an interactive operation with the user, in a step ST121. For example, the handwritten data1a1 is extracted from the handwritten data stored in the image storing RAM 155.

Then, a step ST122 assigns the code data with respect to the extracted handwritten data, through an interactive operation with the user. For example, the code data "2422H" of the fair copy data "a" is assigned with respect to the extracted handwritten data "a". In addition, a step ST123 registers the corresponding relationship of the pointer to the extracted handwritten data and the code data assigned to the extracted handwritten data in the image dictionary 160. In this case, the assignment of the code data is not made by directly specifying the code data, but by specifying the "reading" of the specified code data. Furthermore, it is possible to assign the code data of the fair copy data other than "a" with respect to the extracted handwritten data "a".

On the other hand, in FIG. 31, when the fair copy data of the characters and/or symbols are input by the user from the keyboard 151, the document processing mechanism 152 stores the input code data in the code storing RAM 156 in a step ST131. A step ST132 decides whether or not the input code data is registered in the image dictionary 160. If the decision result in the step ST132 is NO, a step ST133 calculates the image data indicated by the stored code data using the code/image converter 157. A step ST134 stores the calculated image data of the characters and/or symbols in a region of the video RAM 159 indicated by the cursor, and displays the image data on the display unit 153, and the process ends thereafter.

On the other hand, if the decision result in the step ST132 is YES, a step ST135 specifies the pointer indicated by the input code data out of the pointers registered in the image dictionary 160, so as to specify the handwritten data indicated by the input code data. Then, a step ST136 stores the specified handwritten data in the video RAM 159 and displays the handwritten data on the display unit 153.

For example, when the user inputs "a", the handwritten data "a" corresponding to the code data "2422H" of the input "a" is displayed on the display screen of the display unit 153. As a result, it is possible to simply reuse the handwritten data of the created document.

Further, the present invention is not limited to these embodiments, but various variations and modifications may be made without departing from the scope of the present invention.

What is claimed is:

1. A document creating apparatus which creates a document in response to handwritten data generated from a handwritten data input device and displays the created document on a display screen, said document creating apparatus comprising:

a setting unit setting on the display screen one or a plurality of normalized regions having a normalized size as an attribute and one or a plurality of non-normalized regions having no normalized size as the attribute so that said one or a plurality of normalized regions and said one or a plurality of non-normalized regions coexist on the display screen;

a judging unit judging whether input data are input to the normalized region or the non-normalized region;

a memory;

a first storing unit, coupled to said memory and responsive to said judging unit, converting a size of the input data into a normalized size of the normalized region and storing the normalized input data in said memory when said judging unit judges that the input data are input to the normalized region;

a second storing unit, coupled to said memory and responsive to said judging unit, storing the input data in said memory as they are when said judging unit judges that the input data are input to the non-normalized region; and a display device, coupled to the memory, displaying a document so that the size converted input data stored by the first storing unit and the input data stored as they are by the second storing unit coexist in the displayed document.

2. The document creating apparatus as claimed in claim 1, which further comprises:

a displaying unit, responsive to said setting unit, displaying the normalized region and the non-normalized region using mutually different display formats on the display screen.

3. The document creating apparatus as claimed in claim 1, which further comprises:

a first setting changing unit cancelling and changing at least a portion of the normalized region to a non-normalized region after the input data are input.

4. The document creating apparatus as claimed in claim 1, which further comprises:

a second setting changing unit cancelling and changing at least a portion of the non-normalized region to a normalized region after the input data are input.

5. The document creating apparatus as claimed in claim 1, which further comprises:

a third setting changing unit cancelling the normalized size of the normalized region in at least a portion of the normalized region and setting a normalized region having another normalized size within the cancelled portion.

6. The document creating apparatus as claimed in claim 1, which further comprises:

a first converting unit converting a region size of one of the normalized and non-normalized regions into a specified size after the input data are input, and converting a size of all data of the region subject to the conversion and stored in said memory depending on the conversion of the region size.

7. The document creating apparatus as claimed in claim 1, which further comprises:

a second converting unit converting a size of data stored in said memory and corresponding to a portion of one of the normalized and non-normalized regions into a specified size after the input data are input.

8. A document creating apparatus which creates a document in response to handwritten data generated from a handwritten data input device and displays the created document on a display screen, said document creating apparatus comprising:

a setting unit setting on the display screen a plurality of normalized regions having different normalized sizes, said plurality of normalized regions coexisting on the display screen with a non-normalized region;

a judging unit judging one of said normalized regions to which input data are input;

a memory;

a storing unit, coupled to said memory and responsive to said judging unit, converting a size of the input data into a normalized size of the normalized region judged by said judging unit and storing the converted input data in said memory; and a display device, coupled to the memory, displaying the converted input data stored in the memory in a document so that the converted data coexists in the document with non-normalized input data input to the non-normalized region.

9. The document creating apparatus as claimed in claim 8, which further comprises:

a displaying unit, responsive to said setting unit, displaying each of the normalized regions using mutually different display formats on the display screen.

10. The document creating apparatus as claimed in claim 8, which further comprises:

a setting changing unit cancelling the normalized size in at least a portion of the normalized region and setting a normalized region having another normalized size within the cancelled portion.

11. The document creating apparatus as claimed in claim 8, which further comprises:

a changing unit changing a size of data subject to processing and stored in said memory when carrying out one of move and copy operations so that a size of data to be moved or copied matches a size of data a moving or copying destination, said data subject to processing being one of data to be moved or copied to another normalized region and data at the moving or copying destination.

12. The document creating apparatus as claimed in claim 8, which further comprises:

a first converting unit converting a region size of the normalized region into a specified size after the input data are input, and converting a size of all of data of the region subject to the conversion and stored in said memory depending on the conversion of the region size.

13. The document creating apparatus as claimed in claim 8, which further comprises:

a second converting unit converting a size of data stored in said memory and corresponding to a portion of the normalized region into a specified size after the input data are input.

14. A document creating apparatus which creates a document in response to handwritten data generated from a handwritten data input device and displays the created document on a display screen, said document creating apparatus comprising:

a memory;

a first input mode for inputting input data to a normalized region set on the display screen and storing the input data in said memory after converting a size of the input data into a normalized size;

a second input mode for inputting the input data to a non-normalized region set on the display screen and coexisting on the display screen with said normalized region, and storing the input data in said memory without converting the size of the input data into the normalized size;

a setting changing unit cancelling the input mode in at least a portion of the region to which the input data are input in one of said first and second input modes, and changing the cancelled portion into a region to which an input is made in the other of said first and second input modes; and a display device displaying the converted input data stored by the first input mode and the non-converted input data stored by the second input mode in a document on the display screen so that the displayed converted data and non-converted data coexist in the displayed document.

15. A document creating apparatus which creates a document in response to handwritten data generated from a handwritten data input device and displays the created document on a display screen, said document creating apparatus comprising:

a memory;

a storing unit storing input data in said memory after converting a size of the input data into a normalized size; and a setting changing unit cancelling the normalized size used to input the input data in at least a portion of a data input region on the display screen, and setting a data input region having another normalized size within the cancelled portion.

16. A document creating apparatus comprising:

a keyboard generating code data;

a converting unit converting the code data generated from said keyboard into character/symbol data related to at least one of characters and symbols;

a handwritten data input device generating handwritten data; and a generating unit generating displaying data for displaying the handwritten data by changing a size of the handwritten data generated from said handwritten data input device to a size of the character/symbol data output from said converting unit.

17. The document creating apparatus as claimed in claim 16, which further comprises:

a recognizing unit recognizing the handwritten data generated from said handwritten data input device and inputting the code data indicated by the recognized handwritten data to said converting unit.

18. A document creating apparatus comprising:

a keyboard generating code data;

a converting unit converting the code data generated from said keyboard into character/symbol data related to at least one of characters and symbols;

a handwritten data input device generating handwritten data;

a normalizing unit generating displaying data for displaying the handwritten data by normalizing a size of the handwritten data generated from said handwritten data input device; and a generating unit generating displaying data for displaying the character/symbol data by changing a size of the character/symbol data output from said converting unit to a size of the handwritten data output from said normalizing unit.

19. The document creating apparatus as claimed in claim 18, which further comprises:

a recognizing unit recognizing the handwritten data generated from said handwritten data input device and inputting the code data indicated by the recognized handwritten data to said converting unit.

20. A document creating apparatus comprising:

a keyboard generating code data;

a converting unit converting the code data generated from said keyboard into character/symbol data related to at least one of characters and symbols;

a handwritten data input device generating handwritten data; an image memory unit storing the handwritten data;

a display memory unit;

a developing unit developing the character/symbol data output from said converting unit in said image memory unit; and a displaying unit generating displaying data for displaying a created document and to be stored in said display memory unit from the data stored in said image memory unit the handwritten data and the character/symbol data thereby both being processed as image data so that the created document has a format in which the handwritten data and fair copy data of said at least one of characters and symbols coexist in the created document.

21. The document creating apparatus as claimed in claim 20, which further comprises:

a normalizing unit normalizing a size of the handwritten data generated from said handwritten data input device and storing the normalized handwritten data in said image memory unit.

22. A document creating apparatus comprising:

a keyboard generating code data;

a converting unit converting the code data generated from said keyboard into character/symbol data related to at least one of characters and symbols;

a handwritten data input device generating handwritten data;

a first image memory unit storing image data;

a second image memory unit storing the handwritten data;

a developing unit developing the character/symbol data output from said converting unit in said first image memory unit; and a generating unit generating displaying data for displaying a created document and to be stored in said display memory unit from the data stored in said image memory unit and the data stored in said second image memory unit, the handwritten data and the character/symbol data thereby both being processed as image data so that the created document has a format in which the handwritten data and fair copy data of said at least one of characters and symbols coexist in the created document.

23. The document creating apparatus as claimed in claim 22, which further comprises:

a normalizing unit normalizing a size of the handwritten data generated from said handwritten data input device and storing the normalized handwritten data in said second image memory units.

24. A document creating apparatus comprising:

a handwritten data input device generating handwritten data;

an extracting unit extracting a handwritten data block made up of an input unit of one or a plurality of handwritten data out of the handwritten data input from said handwritten data input device;

an assigning unit assigning a label written by one or a plurality of code data with respect to the handwritten data block extracted by said extracting unit;

a managing unit managing management data related to a corresponding relationship of the label assigned by said assigning unit and the corresponding handwritten data; and a retrieving unit retrieving handwritten data for which a retrieval request is made by referring to the management data of said managing unit in response to the retrieval request for the handwritten data specifying the label thereof.

25. The document creating apparatus as claimed in claim 24, wherein a portion of the handwritten data block extracted by said extracting unit includes an image of character/symbol data indicated by the code data, said character/symbol data being related to at least one of characters and symbols.

26. The document creating apparatus as claimed in claim 24, which further comprises:

a image memory unit storing handwritten data; and a normalizing unit normalizing a size of the handwritten data generated from said handwritten data input device and storing the normalized handwritten data in said image memory unit.

27. A document creating apparatus comprising:

a handwritten data input device generating handwritten data;

an assigning unit assigning code data of character/symbol data with respect to an input unit of the handwritten data block generated from said handwritten data input device, said character/symbol data being related to at least one of characters and symbols;

a managing unit managing management data related to a corresponding relationship of the code data assigned by said assigning unit and the corresponding input unit of the handwritten data;

a retrieving unit retrieving handwritten data corresponding to input code data if the input code data is registered in said managing unit; and a selecting unit selecting the handwritten data retrieved by said retrieving unit as input data in place of the character symbol data indicated by the input code data.

28. The document creating apparatus as claimed in claim 27, which further comprises:

an image memory unit storing handwritten data; and a normalizing unit normalizing a size of the handwritten data generated from said handwritten data input device and storing the normalized handwritten data in said image memory unit.

29. The document creating apparatus as claimed in claim 27, wherein said assigning unit assigns the code data of the character/symbol data corresponding to the handwritten data with respect to the input unit of the handwritten data input from said handwritten data input device.

30. A computer program product having a computer readable medium having computer program logic recorded thereon for performing document processing which creates a document in response to handwritten data generated from a handwritten data input device and displays the created document on a display screen, said computer program product comprising:

a setting unit setting on the display screen one or a plurality of normalized regions having a normalized size as an attribute and one or a plurality of non-normalized regions having no normalized size as the attribute so that said one or a plurality of normalized regions and said one or a plurality of non-normalized regions coexist on the display screen;

a judging unit judging whether input data are input to the normalized region or the non-normalized region;

a first storing unit, responsive to said judging unit, converting a size of the input data into a normalized size of the normalized region and storing the normalized input data in a memory when said judging unit judges that the input data are input to the normalized region;

a second storing unit, coupled to said memory and responsive to said judging unit, storing the input data in said memory as they are when said judging unit judges that the input data are input to the non-normalized region; and a display device displaying a document so that the size-converted input data stored by the first storing unit and the input data stored as they are by the second storing unit coexist in the displayed document.

31. The computer program product as claimed in claim 30, which further comprises:

a displaying unit, responsive to said setting unit, displaying the normalized region and the non-normalized region using mutualy different display formats on the display screen.

32. The computer program product as claimed in claim 30, which further comprises:

a first setting changing unit cancelling and changing at least a portion of the normalized region to a non-normalized region after the input data are input.

33. The computer program product as claimed in claim 30, which further comprises:

a second setting changing unit cancelling and changing at least a portion of the non-normalized region to a normalize region after the input data are input.

34. The computer program product as claimed in claim 30, which further comprises:

a third setting changing unit cancelling the normalized size of the normalized region in at least a portion of the normalized region and setting a normalized region having another normalized size within the cancelled portion.

35. The computer program product as claimed in claim 30, which further comprises:

a first converting unit converting a region size of one of the normalized and non-normalized regions into a specified size after the input data are input, and converting a size of all data of the region subject to the conversion and stored in said memory depending on the conversion of the region size.

36. The computer program product as claimed in claim 30, which further comprises:

a second converting unit converting a size of data stored in said memory and corresponding to a portion of one of the normalized and non-normalized regions into a specified size after the input data are input.

37. A computer program product having a computer readable medium having computer program logic recorded thereon for performing document processing which creates a document in response to handwritten data generated from a handwritten data input device and displays the created document on a display screen, said computer program product comprising:

a setting unit setting on the display screen a plurality of normalized regions having different normalized sizes, said plurality of normalized regions coexisting on the display screen with a non-normalized region;

a judging unit judging one of said normalized regions to which input data are input; a storing unit, responsive to said judging unit, converting a size of the input data into a normalized size of the normalized region judged by said judging unit and storing the converted input data in a memory; and a display device displaying the stored, size-converted input data in a document so that the size-converted data coexists in the document with non-converted input data input to the non-normalized region.

38. The computer program product as claimed in claim 37, which further comprises:

a displaying unit, responsive to said setting unit, displaying each of the normalized regions using mutuly different display formats on the display screen.

39. The computer program product as claimed in claim 37, which further comprises:

a setting changing unit cancelling the normalized size in at least a portion of the normalized region and setting a normalized region having another normalized size within the cancelled portion.

40. The computer program product as claimed in claim 37, which further comprises:

a changing unit changing a size of data subject to processing and stored in said memory when carrying out one of move and copy operations so that a size of data to be moved or copied matches a size of data at a moving or copying destination, said data subject to processing being one of data to be moved or copied to another normalized region and data at the moving or copying destination.

41. The computer program product as claimed in claim 37, which further comprises:

a first converting unit converting a region size of the normalized region into a specified size after the input data are input, and converting a size of all of data of the region subject to the conversion and stored in said memory depending on the conversion of the region size.

42. The computer program product as claimed in claim 37, which further comprises:

a second converting unit converting a size of data stored in said memory and corresponding to a portion of the normalized region into a specified size after the input data are input.

43. A computer program product having a computer readable medium having computer program logic recorded thereon for performing document processing which creates a document in response to handwritten data generated from a handwritten data input device and displays the created document on a display screen, said computer program product comprising:

a first input mode for inputting input data to a normalized region set on the display screen and storing the input data in a memory after converting a size of the input data into a normalized size;

a second input mode for inputting the input data to a non-normalized region set on the display screen and storing the input data in said memory without converting the size of the input data into the normalized size, said normalized region and said non-normalized region coexisting on the display screen;

a setting changing unit cancelling the input mode in at least a portion of the region to which the input data are input in one of said first and second input modes, and changing the cancelled portion into a region to which an input is made in the other of said first and second input modes; and a display device displaying the converted input data stored by the first input mode and the nonconverted input data stored by the second input mode in a document so that the displayed converted input data and non-converted input coexist in the displayed document.

44. A computer program product having a computer readable medium having computer program logic recorded thereon for performing document processing which creates a document in response to handwritten data generated from a handwritten data input device and displays the created document on a display screen, said computer program product comprising:

a storing unit storing input data in a memory after converting a size of the input data into a normalized size; and a setting changing unit cancelling the normalized size used to input the input data in at least a portion of a data input region on the display screen, and setting a data input region having another normalized size within the cancelled portion.

45. A computer program product having a computer readable medium having computer program logic recorded thereon for forming document processing which creates a document, said computer program product comprising:

a converting unit converting the code data generated from a keyboard into character/symbol data related to at least one of characters and symbols; and a generating unit generating displaying data for displaying handwritten data by changing a size of the handwritten data generated from a handwritten data input device to a size of the character/symbol data output from said converting unit.

46. The computer program product as claimed in claim 45, which further comprises:

a recognizing unit recognizing the handwritten data generated from said handwritten data input device and inputting the code data indicated by the recognized handwritten data to said converting unit.

47. A computer program product having a computer readable medium having computer program logic recorded thereon for performing document processing which creates a document, said computer program product comprising.

a converting unit converting code data generated from a keyboard into character/symbol data related to at least one of characters and symbols;

a normalizing unit generating displaying data for displaying handwritten data by normalizing a size of the handwritten data generated from a handwritten data input device; and a generating unit generating displaying data for displaying the character/symbol data by changing a size of the character/symbol data output from said converting unit to a size of the handwritten data output from said normalizing unit.

48. The computer program product as claimed in claim 47, which further comprises:

a recognizing unit recognizing the handwritten data generated from said handwritten data input device and inputting the code data indicated by the recognized handwritten data to said converting unit.

49. A computer program product having a computer readable medium having computer program logic recorded thereon for performing document processing which creates a document, said computer program product comprising:
- a converting unit converting code data generated from a keyboard into character/symbol data related to at least one of characters and symbols;
- a developing unlit developing the character/symbol data output from said converting unit in an image memory unit; and
- a displaying unit generating displaying data for displaying a created document and to be stored in a display memory unit from the data stored in said image memory unit so that the created document has a format in which a fair cop of said at least one of characters and symbols coexists in the created document with handwritten data.

50. The computer program product as claimed in claim 49, which further comprises:
- a normalizing unit normalizing a size of handwritten data generated from a handwritten data input device and storing the normalized handwritten data in said image memory unit.

51. A computer program product having a computer readable medium having computer program logic recorded thereon for performing document processing which creates a document, said computer program product comprising:
- a converting unit converting code data generated from a keyboard into characterlsymbol data related to at least one of characters and symbols;
- a developing unit developing the characterlsymbol data output from said converting unit in a first image memory unit; and
- a generating unit generating displaying data for displaying a created document and to be stored in said display memory unit from the data stored in said first image memory unit and data stored in a second image memory unit storing handwritten data, the handwritten data and the symbols coexist in the created document.

52. The computer program product as claimed in claim 51, which further comprises:
- a normalizing unit normalizing a size of the handwritten data generated from a handwritten data input device and storing the normalized handwritten data in said second image memory unit.

53. A computer program product having a computer readable medium having computer program logic recorded thereon for performing document processing which creates a document, said computer program product comprising:
- an extracting unit extracting a handwritten data block made up of an input unit of one or a plurality of handwritten data out of the handwritten data input from a handwritten data, input device;
- an assigning unit assigning a label written by one or a plurality of code data with respect to the handwritten data block extracted by said extracting unit;
- a managing unit managing management data related to a corresponding relationship of the label assigned by said assigning unit and the corresponding handwritten data; and
- a retrieving unit retrieving handwritten data for which a retrieval request is made by referring to the management data of said managing unit in response to the retrieval request for the handwritten data specifying the label thereof.

54. The computer program product as claimed in claim 53, wherein a portion of the handwritten data block extracted by said extracting unit includes an image of character/symbol data indicated by the code data, said character/symbol data being related to at least one of characters and symbols.

55. The computer program product as claimed in claim 53, which further comprises:
- a normalizing unit normalizing a size of the handwritten data generated from said handwritten data input device and storing the normalized handwritten data in image memory unit.

56. A computer program product having a computer readable medium having computer program logic recorded thereon for performing document processing which creates a document, said computer program product comprising:
- an assigning unit assigning code data of character/symbol data with respect to an input unit of the handwritten data block generated from a handwritten data input device, said character/symbol data being related to at least one of characters and symbols;
- a managing unit managing management data related to a corresponding relationship of the code data assigned by said assigning unit and the corresponding input unit of the handwritten data;
- a retrieving unit retrieving handwritten data corresponding to input code data if the input code data is registered in said managing unit; and
- a selecting unit selecting the handwritten data retrieved by said retrieving unit as input data in place of the character/symbol data indicated by the input code data.

57. The computer program product as claimed in claim 56, which further comprises:
- a normalizing unit normalizing a size of the handwritten data generated from, said handwritten data input device and storing the normalized handwritten data in an image memory unit.

58. The computer program product as claimed in claim 56, wherein said assigning unlit assigns the code data of the character/symbol data corresponding to the handwritten data with respect to the input unit of the handwritten data input from said handwritten data input device.

59. A document creating apparatus comprising:
- a judging unit judging whether input data are input to a normalized region or a non-normalized region on a display screen; and
- a converting unit, when the input data are judged by the judging unit as being input to the normalized region, converting the input data into a normalized size and then storing the converted input data, and, when the input data are judged by the judging unit as being input to the non-normalized region, storing the input data as they are.

60. A document creating process comprising:
- judging whether input data are input to a normalized region or a non-normalized region coexisting on a display screen;
- when the input data are judged by said judging as being input to the normalized region, converting the input data into a normalized size and then storing the converted input data;
- when the input data are judged by said judging as being input to the non-normalized region, storing the input data as they are; and
- creating and displaying a document so that the stored, converted input data and the stored, input data as they are coexist in the displayed document.

61. A computer readable medium comprising document creating software for performing the processes of:

judging whether input data are input to a normalized region or a non-normalized region coexisting on a display screen;

when the input data are judged by said judging as being input to the normalized region, converting the input data into a normalized size and then storing the converted input data;

when the input data are judged by said judging as being input to the non-normalized region, storing the input data as they are; and creating and displaying a document so that the stored, converted input data and the stored, input data as they are coexist in the displayed document.

62. A document creating apparatus which creates a document in response to handwritten data generated from a handwritten data input device and displays the created document on a display screen, said document creating apparatus comprising:

a setting unit setting on the display screen a normalized region having a normalized size as an attribute and a non-normalized region having no normalized size as the attribute;

a judging unit judging whether input data are input to the normalized region or the non-normalized region;

a memory;

a first storing unit, coupled to said memory and responsive to said judging unit, converting a size of the input data into a normalized size of the normalized region and storing the normalized input data in said memory when said judging unit judges that the input data are input to the normalized region; and a second storing unit, coupled to said memory and responsive to said judging unit, storing the input data in said memory as they are when said judging unit judges that the input data are input to the non-normalized region, so that input data input to the normalized region and input data input to the non-normalized region coexist in the created document.

63. A document creating apparatus which creates a document in response to handwritten data generated from a handwritten data input device and displays the created document on a display screen, said document creating apparatus comprising:

a setting unit setting on the display screen a plurality of normalized regions having different normalized sizes;

a judging unit judging one of said normalized regions to which input data are input;

a memory;

a storing unit, coupled to said memory and responsive to said judging unit, converting a size of the input data into a normalized size of the normalized region judged by said judging unit and storing the converted input data in said memory, input data input into the normalized region judged by said judging unit coexisting in the created document with data input to a non-normalized region on the screen display.

64. A document creating apparatus which creates a document in response to handwritten data generated from a handwritten data input device and displays the created document on a display screen, said document creating apparatus comprising:

a memory;

a first input mode for inputting input data to a normalized region set on the display screen and storing the input data in said memory after converting a size of the input data into a, normalized size;

a second input mode for inputting input data to a non-normalized region set on the display screen and storing the input data in said memory without converting the size of the input data into the normalized size; and a setting changing unit cancelling the input mode in at least a portion of the region to which the input data are input in one of said first and second input modes, and changing the cancelled portion into a region to which an input is made in the other of said first and second input modes, input data input to the normalized region and input data input to the non-normalized region coexisting in the created document.

65. A computer program product having a computer readable medium having computer program logic recorded thereon for performing document processing which creates a document in response to handwritten data generated from a handwritten data input device and displays the created document on a display screen, said computer program product comprising:

a setting unit setting on the display screen a normalized region having a normalized size as an attribute and a non-normalized regions having no normalized size as the attribute;

a judging unit judging whether input data are input to the normalized region or the non-normalized region;

a first storing unit, responsive to said judging unit, converting a size of the input data into a normalized size of the normalized region and storing the normalized input data in a memory when said judging unit judges that the input data are input to the normalized region; and a second storing unit, coupled to said memory and responsive to said judging unit, storing the input data in said memory as they are when said judging unit judges that the input data are input to the non-normalized region, input data input to the normalized region and input data input to the non-normalized region coexisting in the created document.

66. A computer program product having a computer readable medium having computer program logic recorded thereon for performing document processing which creates a document in response to handwritten data generated from a handwritten data input device and displays the created document on a display screen, said computer program product comprising:

a setting unit setting on the display screen a plurality of normalized regions having different normalized sizes;

a judging unit judging one of said normalized regions to which input data are input;

a storing unit, responsive to said judging unit, converting a size of the input data into a normalized size of the normalized region judged by said judging unit and storing the converted input data in a memory, the size-converted input data coexisting with non-normalized data in the created document.

67. A computer program product having a computer readable medium having computer program logic recorded thereon for performing document processing which creates a document in response to handwritten data generated from a handwritten data input device and displays the created document on a display screen, said computer program product comprising:

a first input mode for inputting input data to a normalized region set on the display screen and storing the input data in a memory after converting a size of the input data into a normalized size;

a second input mode for inputting the input data to a non-normalized region set on the display screen and storing the input data in said memory without converting the size of the input data into the normalized size; and a setting changing unit cancelling the input mode in at least a portion of the region to which the input data are input in one of said first and second input modes, and changing the cancelled portion into a region to which an input is made in the other of said first and second input modes, input data input to the non-normalized region and input data input to the non-normalized region coexisting in the created document.

68. A document creating apparatus comprising:

a judging unit judging whether input data are input to a normalized region or non-normalized region on a display screen; and a converting unit, when the input data are judged by the judging unit as being input to the normalized region, converting the input data into a normalized size and then storing the converted input data, and, when the input data are judged by the judging unit as being input to the non-normalized region, storing the input data as they are, so that input data input to the normalized region and input data input to the non-normalized region coexist in a created document.

69. A document creating process comprising:

judging whether input data are input to a normalized region or a non-normalized region on a display screen;

when the input data are judged by said Judging as being input to the normalized region, converting the input data into a normalized size and then storing the converted input data; and, when the input data are judged by said judging as being input to the non-normalized region, storing the input data as they are, so that input data input to the normalized region and input data input to the non-normalized region coexist in a created document.

70. A computer readable medium comprising document creating software for performing the processes of:

judging whether input data are input to a normalized region or a non-normalized region on a display screen;

when the input data are judged by said judging as being input to the normalized region, converting the input data into a normalized size and then storing the converted input data; and, when the input data are judged by said judging as being input to the non-normalized region, storing the input data as they are, so that input data input to the normalized region and input data input to the non-normalized region coexist in a created document.

\* \* \* \* \*

UNITED STATES PATENT AND TRADEMARK OFFICE
CERTIFICATE OF CORRECTION

PATENT NO. : 6,317,762 B1 Page 1 of 1
DATED : November 13, 2001
INVENTOR(S) : Toru Okawa et al.

It is certified that error appears in the above-identified patent and that said Letters Patent is hereby corrected as shown below:

Column 29,
Line 19, change "size converted" to -- size-converted --.

Column 39,
Line 10, begin a new paragraph with "an";
Line 19, after "unit" insert -- , --;
Between lines 40 and 41 insert the paragraph -- a display memory unit; --.

Column 33,
Line 44, change "acter symbol" to -- acter/symbol --.

Column 37,
Line 15, change "cop" to -- copy --;
Lines 30 and 32, change "charactersymbol" to -- character/symbol --;
Line 40, after "the" (first occurrence) insert -- character/symbol data both being processed as image data so that the created document has a format in which the handwritten data and fair copy data of said at least one of characters and --;
Line 54, delete ",".

Column 38,
Line 35, delete ",";
Line 45, after "region" (second occurrence) insert -- coexisting --.

Column 40,
Line 2, delete ",".

Signed and Sealed this

Seventeenth Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,317,762 B1
DATED         : November 13, 2001
INVENTOR(S)   : Toru Okawa et al.

It is certified that error appears in the above-identified patent and that said Letters Patent is hereby corrected as shown below:

<u>Column 29,</u>
Line 19, change "size converted" to -- size-converted --.

<u>Column 32,</u>
Line 10, begin a new paragraph with "an";
Line 19, after "unit" insert -- , --;
Between lines 40 and 41 insert the paragraph -- a display memory unit; --.

<u>Column 33,</u>
Line 44, change "acter symbol" to -- acter/symbol --.

<u>Column 37,</u>
Line 15, change "cop" to -- copy --;
Lines 30 and 32, change "charactersymbol" to -- character/symbol --;
Line 40, after "the" (first occurrence) insert -- character/symbol data both being processed as image data so that the created document has a format in which the handwritten data and fair copy data of said at least one of characters and --;
Line 54, delete ",".

<u>Column 38,</u>
Line 35, delete ",";
Line 45, after "region" (second occurrence) insert -- coexisting --.

UNITED STATES PATENT AND TRADEMARK OFFICE
CERTIFICATE OF CORRECTION

PATENT NO.    : 6,317,762 B1
DATED         : November 13, 2001
INVENTOR(S)   : Toru Okawa et al.

It is certified that error appears in the above-identified patent and that said Letters Patent is hereby corrected as shown below:

Column 40,
Line 2, delete ",".

This Certificate supersedes Certificate of Correction issued September 17, 2002.

Signed and Sealed this

Fourth Day of February, 2003

JAMES E. ROGAN
*Director of the United States Patent and Trademark Office*